United States Patent
Llopis et al.

(10) Patent No.: US 11,719,451 B2
(45) Date of Patent: Aug. 8, 2023

(54) BUILDING SYSTEM WITH EARLY FAULT DETECTION

(71) Applicant: Johnson Controls Tyco IP Holdings LLP, Milwaukee, WI (US)

(72) Inventors: Jaume Amores Llopis, Cork (IE); Young M. Lee, Old Westbury, NY (US); Sugumar Murugesan, Santa Clara, CA (US); Steven R. Vitullo, Milwaukee, WI (US)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 558 days.

(21) Appl. No.: 16/725,952

(22) Filed: Dec. 23, 2019

(65) Prior Publication Data
US 2021/0190354 A1 Jun. 24, 2021

(51) Int. Cl.
*F24F 11/38* (2018.01)
*F24F 11/49* (2018.01)
*G06F 17/18* (2006.01)
*H04L 67/12* (2022.01)
*F24F 120/20* (2018.01)

(52) U.S. Cl.
CPC ............. *F24F 11/38* (2018.01); *F24F 11/49* (2018.01); *G06F 17/18* (2013.01); *H04L 67/12* (2013.01); *F24F 2120/20* (2018.01)

(58) Field of Classification Search
CPC ........ F24F 11/38; F24F 11/49; F24F 2120/20; F24F 2110/10; F24F 2110/20; F24F 2110/40; F24F 2110/50; F24F 2120/10; G06F 17/18; H04L 67/12; Y02B 30/70
See application file for complete search history.

(56) References Cited

U.S. PATENT DOCUMENTS

| | | | | |
|---|---|---|---|---|
| 2007/0255441 | A1* | 11/2007 | Antanies | G05B 23/0267 700/108 |
| 2008/0270071 | A1* | 10/2008 | Marvasti | G06K 9/00536 702/179 |
| 2014/0012987 | A1* | 1/2014 | Jung | G06F 9/5083 709/226 |

(Continued)

FOREIGN PATENT DOCUMENTS

KR 20160006045 A * 1/2018 ........... G05B 19/418

OTHER PUBLICATIONS

Basseville et al., "Detection of Abrupt Changes: Theory and Application," (1993), Englewod Cliffs: Prentice Hall, 469, pages.

*Primary Examiner* — Santosh R Poudel
(74) *Attorney, Agent, or Firm* — Foley & Lardner LLP

(57) ABSTRACT

A building system for detecting faults in an operation of building equipment. The building system comprising one or more memory devices configured to store instructions thereon that cause the one or more processors to perform a cumulative sum (CUSUM) analysis on actual building data and corresponding predicted building data to obtain cumulative sum values for a first plurality of times within a first time period; analyze cumulative sum values associated with a second plurality of times occurring before the first time to identify a second time of the second plurality of times at which a second cumulative sum value is at a local minimum; and determine that a first fault began at the second time.

20 Claims, 15 Drawing Sheets

(56) References Cited

U.S. PATENT DOCUMENTS

| | | | | |
|---|---|---|---|---|
| 2017/0276571 A1* | 9/2017 | Vitullo | .................... | G06Q 10/06 |
| 2018/0091649 A1* | 3/2018 | Cao | .......................... | G06F 17/18 |
| 2018/0100195 A1* | 4/2018 | Schultz | ................... | G16H 50/30 |
| 2018/0375444 A1 | 12/2018 | Gamroth | | |
| 2019/0205805 A1* | 7/2019 | Albino | .................... | H04L 43/50 |
| 2019/0391573 A1* | 12/2019 | Wang | ..................... | G05B 15/02 |

* cited by examiner

BUILDING SYSTEM WITH EARLY FAULT DETECTION

BACKGROUND

The present disclosure relates generally to building systems. More particularly, the present disclosure relates to detecting the beginning and/or the end of faults that occur in such building systems.

It may be important for building managers to accurately identify time periods in which faults occurred that may have caused building equipment to operate improperly. Such faults may cause buildings to utilize more energy or for other aspects of the buildings to be affected such as their security systems. Building managers may use fault data to diagnose problems that occurred in their building systems. In various methodologies, to identify faults, building managers may use methods that do not accurately identify the boundaries (e.g., the beginning and the end) of the faults. Consequently, building managers may not be able to accurately diagnose problems that occurred in their building systems.

SUMMARY

Early Fault Detection

One implementation of the present disclosure is a building system for detecting faults in an operation of building equipment. The building system may comprise one or more memory devices configured to store instructions thereon that, when executed by one or more processors, cause the one or more processors to perform a cumulative sum (CUSUM) analysis on actual building data and corresponding predicted building data to obtain cumulative sum values for a first plurality of times within a first time period, wherein the cumulative sum values are cumulative error values determined based on the actual building data and the corresponding predicted building data; determine a first time at which a first cumulative sum value reaches a threshold; analyze cumulative sum values associated with a second plurality of times occurring before the first time to identify a second time of the second plurality of times at which a second cumulative sum value is at a local minimum; and determine that a first fault began at the second time.

In some embodiments, the one or more processors analyze the cumulative sum values associated with the second plurality of times by determining a first gradient at the first time; obtaining a first gradient step based on the first gradient; determining the second time based on the first gradient step; determining a second gradient at the second time; and determining whether the second gradient is beneath a second threshold. The one or more processors may determine that the first fault began at the second time based on a determination that the second gradient is beneath the second threshold.

In some embodiments, the one or more processors analyze the cumulative sum values associated with the second plurality of times by determining a first gradient at the first time; obtaining a first gradient step based on the first gradient; determining a third time based on the first gradient step; determining a second gradient at the third time; determining whether the second gradient is below or equal to a second threshold; and responsive to determining that the second gradient is not below the second threshold, iteratively repeating the determining, obtaining, determining, determining, and determining steps for different times until determining that a gradient of a time is beneath the second threshold. The one or more processors may determine that the first fault began at the second time based on a determination that a gradient of a time is beneath the second threshold.

In some embodiments, the gradient steps decrease in size as more gradient steps are obtained.

In some embodiments, the CUSUM analysis is a first CUSUM analysis associated with positive error values and the threshold is a first threshold, and wherein the instructions cause the one or more processors to perform a second CUSUM analysis associated with negative error values in the actual building data and the corresponding predicted building data to obtain a third cumulative sum value at each of the first plurality of times within the first time period; determine a third time at which a third cumulative sum value exceeds a second threshold; analyze third cumulative sum values associated with a second plurality of times occurring before the third time to identify a fourth cumulative sum value at a second local minimum at a fourth time occurring before the third time; and determine that a second fault began at the fourth time.

In some embodiments, the instructions cause the one or more processors to determine a second time period in which the first fault occurred and a third time period in which the second fault occurred; aggregate the second time period and the third time period to obtain an aggregated time period; and generate a user interface displaying the aggregated time period.

In some embodiments, the first fault is related to an energy consumption, a building occupancy, a temperature, a pressure, or a humidity.

In some embodiments, the one or more processors analyze the cumulative sum values associated with the second plurality of times by performing a smoothing operation on the cumulative sum values to obtain a smoothed curve; and identifying a minimum of the smoothed curve. The instructions may cause the one or more processors to determine that the first fault began at the second time by determining that the minimum of the smoothed curve is at the second time.

In some embodiments, the instructions cause the one or more processors to operate one or more pieces of building equipment based on the first fault; or generate one or more user interfaces including interface elements based on the first fault.

In some embodiments, the instructions cause the one or more processors to determine that the first fault began at the second time by identifying the second time; identifying a third time and a fourth time occurring after the second time; determining a first gradient corresponding to the third time and a second gradient corresponding to the fourth time; determining if each of the first gradient and the second gradient exceed a second threshold; and based on determining that each of the first gradient and the second gradient exceed the second threshold, determining that the first fault began at the second time.

In some embodiments, the instructions cause the one or more processors to perform the CUSUM analysis on the actual building data and the corresponding predicted building data to obtain the cumulative sum values for the first plurality of times by comparing the actual building data and the corresponding predicted building data to obtain an error value for at least a portion of the first plurality of times; and for each of the portion of the first plurality of times: obtain a previous cumulative sum value associated with a previous time; identify the error value associated with the time of the portion of the first plurality of times; and aggregate the error value with the previous cumulative sum value to obtain the cumulative sum value for the time.

Another implementation is a method for detecting faults in an operation of building equipment, the method comprising performing, by a processing circuit, a cumulative sum (CUSUM) analysis on actual building data and corresponding predicted building data to obtain cumulative sum values for a first plurality of times within a first time period, wherein the cumulative sum values are cumulative error values determined based on the actual building data and the corresponding predicted building data; determining, by the processing circuit, a first time at which a first cumulative sum value reaches a threshold; analyzing, by the processing circuit, cumulative sum values associated with a second plurality of times occurring before the first time to identify a second time of the second plurality of times at which a second cumulative sum value is at a local minimum; and determining, by the processing circuit, that a first fault began at the second time.

In some embodiments, analyzing the cumulative sum values associated with the second plurality of times comprises determining a first gradient at the first time; obtaining a first gradient step based on the first gradient; determining the second time based on the first gradient step; determining a second gradient at the second time; and determining whether the second gradient is beneath a second threshold. Determining that the first fault began at the second time may be performed based on a determination that the second gradient is beneath the second threshold.

In some embodiments, analyzing the cumulative sum values associated with the second plurality of times comprises determining a first gradient at the first time; obtaining a first gradient step based on the first gradient; determining a third time based on the first gradient step; determining a second gradient at the third time; determining whether the second gradient is below or equal to a second threshold; and responsive to determining that the second gradient is not beneath the second threshold, iteratively repeating the determining, obtaining, determining, determining, and determining steps for different times until determining that a gradient of a time is beneath the second threshold. Determining that the first fault began at the second time may be performed based on a determination that a gradient of a time is beneath the second threshold.

In some embodiments, the gradient steps decrease in size as more gradient steps are obtained.

In some embodiments, the CUSUM analysis is a first CUSUM analysis associated with positive error values and the threshold is a first threshold, the method further comprising performing, by the processing circuit, a second CUSUM analysis associated with negative error values in the actual building data and the corresponding predicted building data to obtain a third cumulative sum value at each of the first plurality of times within the first time period; determining, by the processing circuit, a third time at which a third cumulative sum value exceeds a second threshold; analyzing, by the processing circuit, third cumulative sum values associated with a second plurality of times occurring before the third time to identify a fourth cumulative sum value at a second local minimum at a fourth time occurring before the third time; and determining, by the processing circuit, that a second fault began at the fourth time.

In some embodiments, the method further comprises determining, by the processing circuit, a second time period in which the first fault occurred and a third time period in which the second fault occurred; aggregating, by the processing circuit, the second time period and the third time period to obtain an aggregated time period; and generating, by the processing circuit, a user interface displaying the aggregated time period.

Another implementation of the present disclosure is a non-transitory computer-readable medium having instructions stored thereon that, upon execution by a processor, cause the processor to perform operations to detect faults in operation of a computing system. The operations may comprise performing a cumulative sum (CUSUM) analysis on actual data and corresponding predicted data to obtain cumulative sum values for a first plurality of times within a first time period, wherein the cumulative sum values are cumulative error values determined based on the actual data and the corresponding predicted data; determining a first time at which a first cumulative sum value reaches a threshold; determining one or more gradient steps associated with times before the first time; based on the one or more gradient steps, identify a second time at which a gradient is below a threshold; and determining that a first fault began at the second time.

In some embodiments, the CUSUM analysis is a first CUSUM analysis associated with positive error values and the threshold is a first threshold, and wherein the instructions cause the processor to perform a second CUSUM analysis associated with negative error values in the actual data and the corresponding predicted data to obtain a third cumulative sum value at each of the first plurality of times within the first time period; determine a third time at which a third cumulative sum value exceeds a second threshold; analyze third cumulative sum values associated with a second plurality of times occurring before the third time to identify a fourth cumulative sum value at a second local minimum at a fourth time occurring before the third time; and determine that a second fault began at the fourth time.

In some embodiments, the instructions cause the processor to determine a second time period in which the first fault occurred and a third time period in which the second fault occurred; aggregate the second time period and the third time period to obtain an aggregated time period; and generate a user interface displaying the aggregated time period.

Adaptive Fault Detection

One implementation of the present disclosure is a building system for detecting faults in an operation of building equipment, the building system comprising one or more memory devices configured to store instructions thereon that, when executed by one or more processors, cause the one or more processors to perform a cumulative sum (CUSUM) analysis on actual building data and corresponding predicted building data to obtain cumulative sum values for a plurality of times within a first time period, wherein the cumulative sum values are cumulative error values determined based on the actual building data and the corresponding predicted building data; determine a first time at which a first cumulative sum value is at a first maximum; identify one or more second cumulative sum values at one or more second maximums at one or more second times occurring after the first time; compare a portion of the identified one or more second cumulative sum values to a threshold; and based on determining that none of the portion of the identified second cumulative sum values exceed the threshold, determine that a first fault ended at the first time.

In some embodiments, the instructions cause the one or more processors to determine a third time at which a third cumulative sum value is at a third maximum; identify a fourth cumulative sum value at a fourth maximum at a fourth time that occurs after the third time; compare the identified fourth cumulative sum value to the threshold; based on determining that the fourth cumulative sum value exceeds the threshold, identify a fifth cumulative sum value at a fifth maximum at a fifth time that occurs after the fourth time; compare the identified fifth cumulative sum value to the threshold; and based on determining that the identified fifth cumulative sum value does not exceed the threshold, determine that a second fault ended at the fourth time.

In some embodiments, the instructions cause the one or more processors to perform the CUSUM analysis on the actual building data and the corresponding predicted building data to obtain the cumulative sum values for the plurality of times by comparing the actual building data and the corresponding predicted building data to obtain an error value for at least a portion of the plurality of times; and for each of the portion of the plurality of times: obtain a previous cumulative sum value associated with a previous time; identify the error value associated with the time of the portion of the plurality of times; and aggregate the error value with the previous cumulative sum value to obtain the cumulative sum value for the time.

In some embodiments, the CUSUM analysis is a first CUSUM analysis associated with positive error values and the threshold is a first threshold, and wherein the instructions cause the one or more processors to perform a second CUSUM analysis associated with negative error values in the actual building data and the corresponding predicted building data to obtain a third cumulative sum value at each of the plurality of times within the first time period; determine a third time at which one of the third cumulative sum values is at a third maximum; identify a fourth cumulative sum value at a fourth maximum at a fourth time that occurred after the third time; compare the fourth cumulative sum value to a second threshold; based on determining that the fourth cumulative sum value does not exceed the second threshold, determine that a second fault ended at the third time.

In some embodiments, the instructions cause the one or more processors to determine a second time period with which the first fault occurred and a third time period with which the second fault occurred; aggregate the second time period and the third time period to obtain an aggregated time period; and generate a user interface displaying the aggregated time period.

In some embodiments, the first fault is related to an energy consumption, a building occupancy, a temperature, a pressure, or a humidity.

In some embodiments, the threshold is a first threshold and wherein the instructions cause the one or more processors to determine a third time at which one of the cumulative sum values exceeds a second threshold. The first time of the first maximum is after the third time; and determine that the first fault occurred for a second time period between the third time and the first time.

In some embodiments, the second threshold is equal to the first threshold.

In some embodiments, the instructions cause the one or more processors to compare the identified second cumulative sum value to the threshold by determining a third time at which the cumulative sum values begin to increase; determining a third cumulative sum value at the third time; comparing the second cumulative sum value with the third cumulative sum value to obtain a height; and comparing the height to the threshold.

In some embodiments, the first maximum is a global maximum and the second maximum is a local maximum.

In some embodiments, the instructions cause the one or more processors to operate one or more pieces of building equipment based on the first fault; or generate one or more user interfaces including interface elements based on the first fault.

Another implementation of the present disclosure is a method for detecting faults in an operation of building equipment. The method may comprise performing, by a processing circuit, a cumulative sum (CUSUM) analysis on actual building data and corresponding predicted building data to obtain cumulative sum values for a plurality of times within a first time period, wherein the cumulative sum values are cumulative error values determined based on the actual building data and the corresponding predicted building data; determining, by the processing circuit, a first time at which a first cumulative sum value is at a first maximum; identifying, by the processing circuit, one or more second cumulative sum values at one or more second maximums at one or more second times occurring after the first time; comparing, by the processing circuit, the identified one or more second cumulative sum values to a threshold; and based on determining that none of the portion of the identified one or more second cumulative sum values exceed the threshold, determining, by the processing circuit, that a first fault ended at the first time.

In some embodiments, the method further comprises determining, by the processing circuit, a third time at which a third cumulative sum value is at a third maximum; identifying, by the processing circuit, a fourth cumulative sum value at a fourth maximum at a fourth time that occurs after the third time; comparing, by the processing circuit, the identified fourth cumulative sum value to the threshold; based on determining that the fourth cumulative sum value exceeds the threshold, identifying, by the processing circuit, a fifth cumulative sum at a fifth maximum at a fifth time that occurs after the fourth time; comparing, by the processing circuit, the identified fifth cumulative sum value to the threshold; and based on determining that the identified fifth cumulative sum value does not exceed the threshold, determining, by the processing circuit, that a second fault ended at the fourth time.

In some embodiments, performing the CUSUM analysis on the actual building data and the corresponding predicted building data to obtain the cumulative sum value for the plurality of times comprises comparing the actual building data and the corresponding predicted building data to obtain an error value for at least a portion of the plurality of times; and for each of the portion of the plurality of times: obtaining a previous cumulative sum value associated with a previous time; identifying the error value associated with the time of the portion of the plurality of times; and aggregating the error value with the previous cumulative sum value to obtain the cumulative sum value for the time.

In some embodiments, the CUSUM analysis is a first CUSUM analysis associated with positive error values and the threshold is a first threshold, and wherein the method further comprises performing a second CUSUM analysis associated with negative error values in the actual building data and the corresponding predicted building data to obtain a third cumulative sum value at each of the plurality of times within the first time period; determining a third time at which one of the third cumulative sum values is at a third maximum; identifying a fourth cumulative sum value at a fourth maximum at a fourth time that occurred after the third time; comparing the fourth cumulative sum value to a second threshold; based on determining that the fourth cumulative sum value does not exceed the second threshold, determining that a second fault ended at the third time.

In some embodiments, the method further comprises determining, by the processing circuit, a second time period with which the first fault occurred and a third time period with which the second fault occurred; aggregating, by the processing circuit, the second time period and the third time period to obtain an aggregated time period; and generating, by the processing circuit, a user interface displaying the aggregated time period.

In an aspect of the present disclosure, a non-transitory computer-readable medium is described. The non-transitory computer readable medium has instructions stored thereon that, upon execution by a processor, cause the processor to perform operations to detect faults in an operation of a system, the operations comprising performing a cumulative sum (CUSUM) analysis on actual data and corresponding predicted data to obtain cumulative sum values for a plurality of times within a first time period, wherein the cumulative sum values are cumulative error values determined based on the actual data and the corresponding predicted data; determining a first time at which a first cumulative sum value is at a first maximum; identifying a second cumulative sum value at a second maximum at a second time occurring after the first time; determining whether cumulative sum values occurring after the second time consistently decrease to a threshold; and based on determining that the cumulative sum values occurring after the second time consistently decrease to the threshold, determining that a first fault ended at the first time.

In some embodiments, the instructions cause the processor to determine whether cumulative sum values occurring after the second time consistently decrease to the threshold by determining a difference between each of the cumulative sum of values; comparing each difference to a second threshold; and based on determining that each difference is lower than the second threshold, determining that the cumulative sum values occurring after the second time consistently decrease to the threshold.

In some embodiments, the instructions cause the processor to determine whether cumulative sum values occurring after the second time consistently decrease to the threshold by performing a smoothing operation on each of the cumulative sum values for the plurality of times to obtain a smoothed cumulative sum function.

In some embodiments, the instructions cause the processor to perform further operations comprising determining a third time at which a third cumulative sum value is at a third maximum; identifying a fourth cumulative sum value at a fourth maximum at a fourth time occurring after the third time; determining whether cumulative sum values occurring after the fourth time consistently decrease to a second threshold; and, based on determining that the cumulative sum values occurring after the second time do not consistently decrease to the second threshold, determining that a second fault ended at a fourth time in which a cumulative sum value reaches the second threshold.

Another implementation of the present disclosure is a building system for detecting faults in an operation of building equipment, the building system comprising one or more memory devices configured to store instructions thereon that, when executed by one or more processors, cause the one or more processors to perform a cumulative sum (CUSUM) analysis on actual building data and corresponding predicted building data to obtain cumulative sum values for a first plurality of times within a first time period. The cumulative sum values may be cumulative error values determined based on the actual building data and the corresponding predicted building data. The instructions may also cause the one or more processors to determine a first time at which a first cumulative sum value reaches a first threshold; analyze cumulative sum values associated with a second plurality of times occurring before the first time to identify a second time of the second plurality of times at which a second cumulative sum value is at a local minimum; determine that a fault began at the second time; determine a third time at which a third cumulative sum value is at a first maximum; identify a fourth cumulative sum value at a second maximum at a fourth time occurring after the third time; compare the identified fourth cumulative sum value to a second threshold; and, based on determining that the identified fourth cumulative sum value does not exceed the second threshold, determine that the fault ended at the third time.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
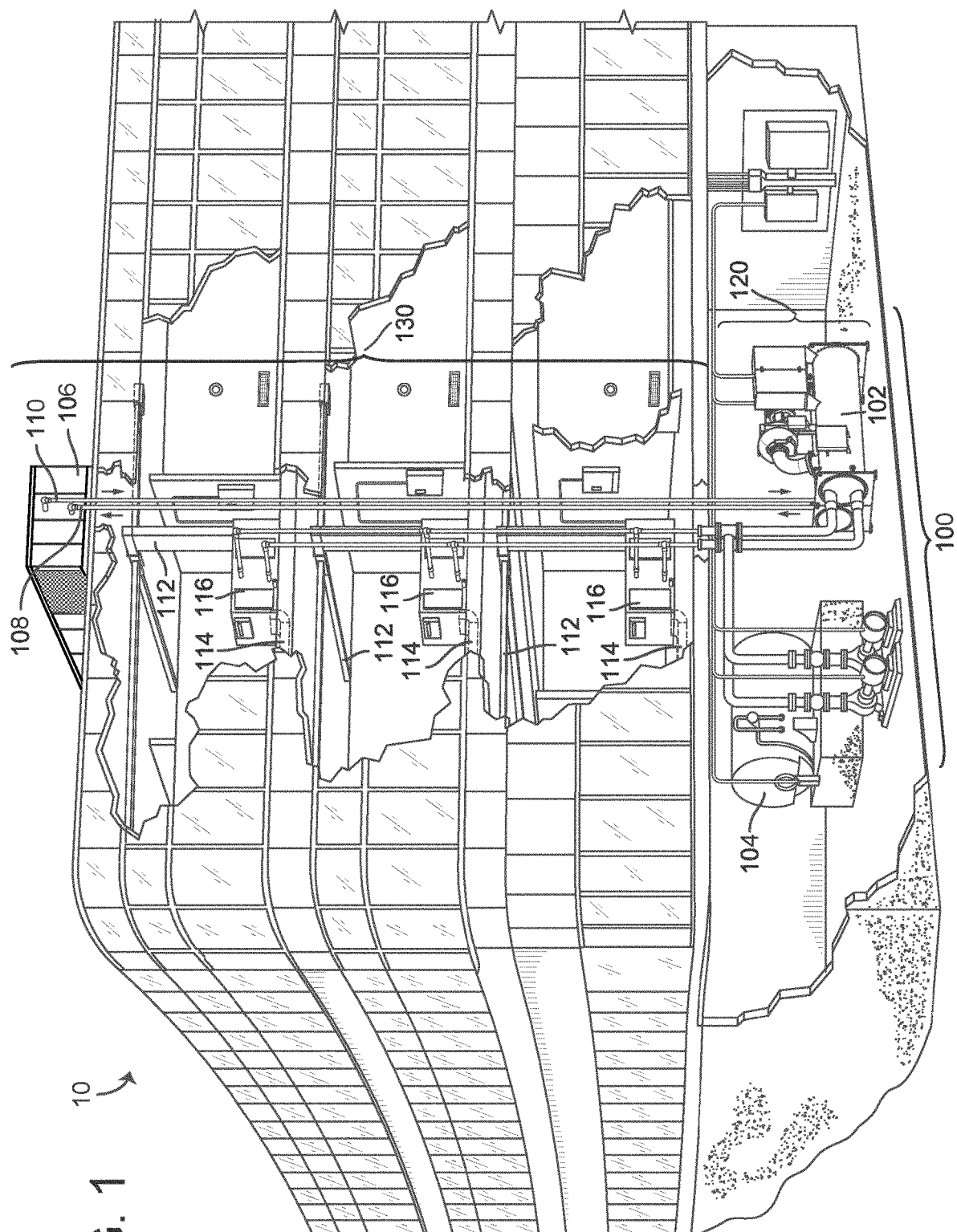
FIG. 1 is a drawing of a building equipped with an HVAC system, according to an exemplary embodiment.

Referring generally to the FIGURES, a fault detection system is shown, according to an exemplary embodiment. The fault detection system can be configured to automatically detect the beginning and end of faults. The fault detection system may detect faults for various types of systems such as, but not limited to, building automation systems (including energy and security systems of the building automation systems), data centers, computer networks, manufacturing systems, cars, construction equipment, televisions, traffic systems, phone networks, etc. The fault detection system may identify such faults by comparing predicted values related to their respective system with their correlated actual values (e.g., values related to the respective system for the same or similar times). The fault detection system may identify differences between the predicted values and the actual values and determine time periods in which faults occurred. This functionality enables system managers to easily assess and improve the health of their system. Such managers may receive a more accurate indication of how their system is performing and/or any errors or faults that occurred within previous time periods.

Early Fault Detection

A building manager may desire to ensure that the beginning of faults are accurately detected when analyzing building data. The building manager may implement a processor to perform a cumulative sum analysis to generate cumulative sum values and determine when a cumulative sum value of a point reaches a fault threshold. The cumulative sum values may be cumulative error values. Using previous implementations, the processor may determine that faults begin at the time in which a cumulative sum value increased to a fault threshold. This can lead to problems as faults may often begin before the cumulative sum values reach the fault threshold. For example, a fault may begin at a time before the cumulative values reached the fault threshold. The fault may have caused the cumulative sum values to reach the fault threshold. Using the previous methods, the processor may not be able to determine that the fault began when the cumulative sum values began increasing because the processor would likely assume that the fault began when the cumulative sum values reached the fault threshold.

The systems and methods described herein provide for a method for early fault detection in which a processor can more accurately determine when faults begin. To do so, for example, the processor may identify a time in which cumulative sum values reach a fault threshold (similar to above). The processor may determine that a fault occurred based on the cumulative sum values reaching the fault threshold. The processor may then analyze the cumulative sum values associated with times occurring before the time that the cumulative sum values reached the fault threshold. The processor may do so to identify a minimum occurring closest to the time that the cumulative sum values reached the fault threshold.

In some embodiments, the processor identifies the minimum by continuously backwardly analyzing cumulative sum values occurring previous to the first time until the processor identifies a cumulative sum value for a previous time that is higher than the cumulative sum value for the next time. For example, the processor may determine that a cumulative sum value for January $4^{th}$ is higher than a cumulative sum value for January $5^{th}$. Thus, the processor may determine that the fault began on January $5^{th}$. In some embodiments, the processor performs a backward gradient descent analysis on the values previous to the first time. The processor may analyze the gradient of the cumulative sum values at various times until it identifies a gradient that is lower than a threshold. The processor may identify the time associated with the gradient below the threshold as the minimum and consequently the time that the fault began. Advantageously, by implementing the methods described herein, a processor may more accurately determine when faults begin instead of assuming that faults begin when a cumulative sum value reaches the fault threshold. Consequently, the processor may provide more accurate data to building managers and/or to building controllers indicating when faults begin so the building managers may better manage their buildings and/or controllers may determine control signals to provide to building equipment.

Adaptive Fault Detection

A building manager may desire to ensure that the end of faults are accurately detected when analyzing building data. A building manager may implement a processor to generate cumulative sum values (e.g., cumulative error values) and determine when the cumulative sum values reach a fault threshold. The processor may identify a time in which the cumulative sum value reaches the fault threshold. The processor may then identify another time in which the cumulative sum values decrease below the fault threshold. Using methods previous to those described herein, the processor may determine that the fault ended when the cumulative sum values decreased below the fault threshold. Using such methods can lead to problems as faults may end before the cumulative sum values cross back below the fault threshold. For example, a fault may end when cumulative sum values reach a maximum and begin decreasing. While the fault may have ended when the cumulative sum values reached the maximum, the processor may detect that the fault ended when the cumulative sum values crossed back below the fault threshold. Consequently, the processor may determine that faults last longer than they actually do.

The systems and methods described herein provide for a method for more accurately detecting the end of faults. To do so, a processor may generate cumulative sum values including cumulative sum values for a number of times over a set time period. The processor may determine a time in which cumulative sum values of a point reach a fault threshold. Accordingly, the processor may determine that a fault occurred within the time period. The processor may identify a maximum occurring after the cumulative sum values reach the fault threshold and identify any subsequent maximums. The processor may compare the subsequent maximums to a second fault threshold. If any of the subsequent maximums exceed the second fault threshold, the processor may determine that a fault ended at the time associated with the last maximum that occurred before the cumulative sum values decrease below the fault threshold. Advantageously, by implementing the methods described herein, the processor may more accurately determine when faults end. The processor may not automatically assume that faults end when the cumulative sum values cross back below the fault threshold.

In some embodiments, the processor may use both of the methods described above to determine the beginning and the end of faults. The processor may more accurately identify the boundaries of such faults. Consequently, the processor may provide more accurate data to building managers and/or to building controllers indicating when faults begin and/or end so the building managers may better manage their buildings and/or controllers may determine control signals to provide to building equipment.

Further, a processor may use the methods described herein to detect faults for any type of system. For example, the processor may use the methods to detect the boundaries for faults in vehicles, automated industrial equipment, computer networks, data centers, manufacturing systems (e.g., manufacturing lines), traffic control systems, construction equipment, etc.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
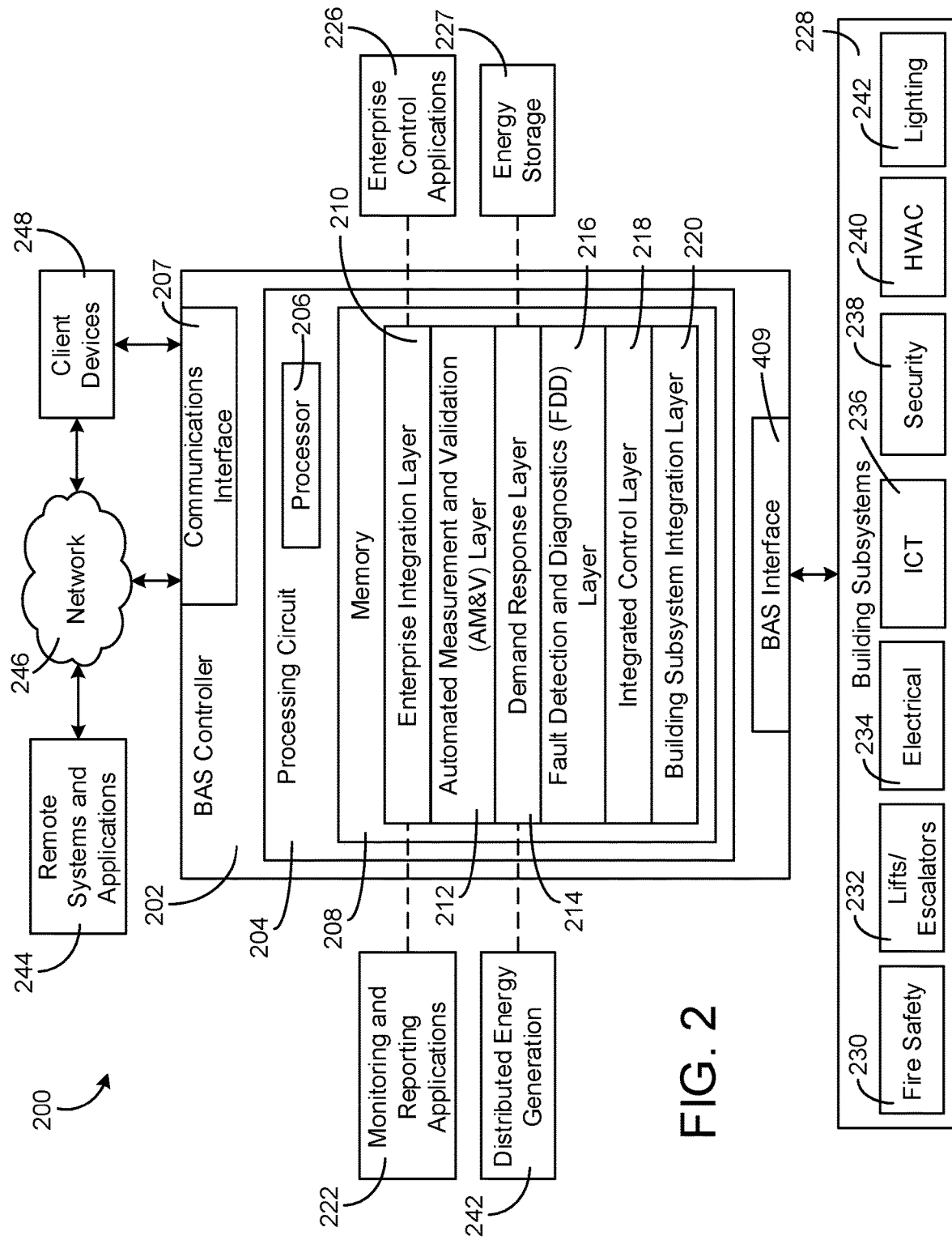
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

Figure 4:
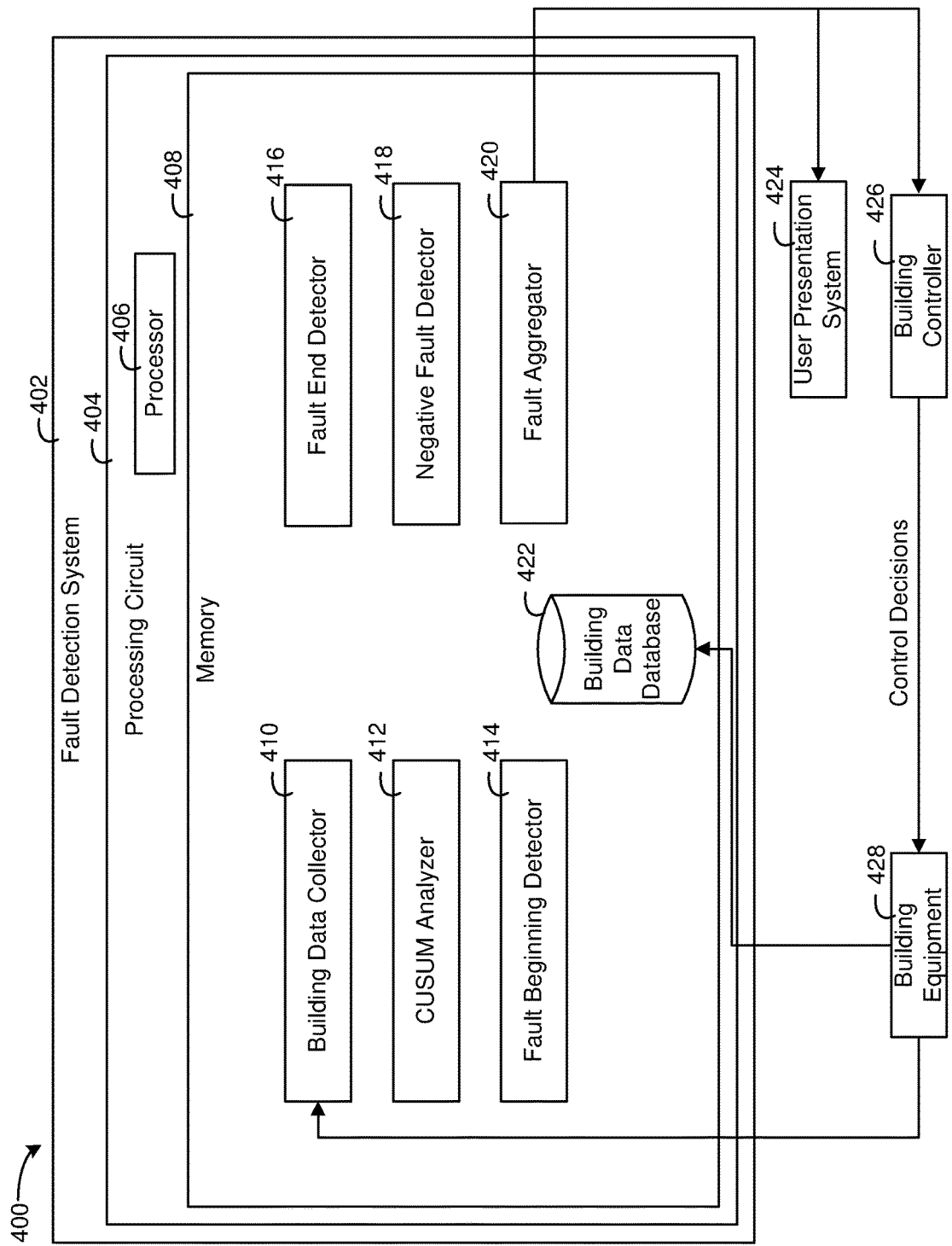
FIG. 4 is a block diagram of a fault detection system that detects when faults occur in the building of FIG. 1, according to an exemplary embodiment.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 4 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data source providers, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source provider. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., timeseries) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Fault Detection

Figure 3:
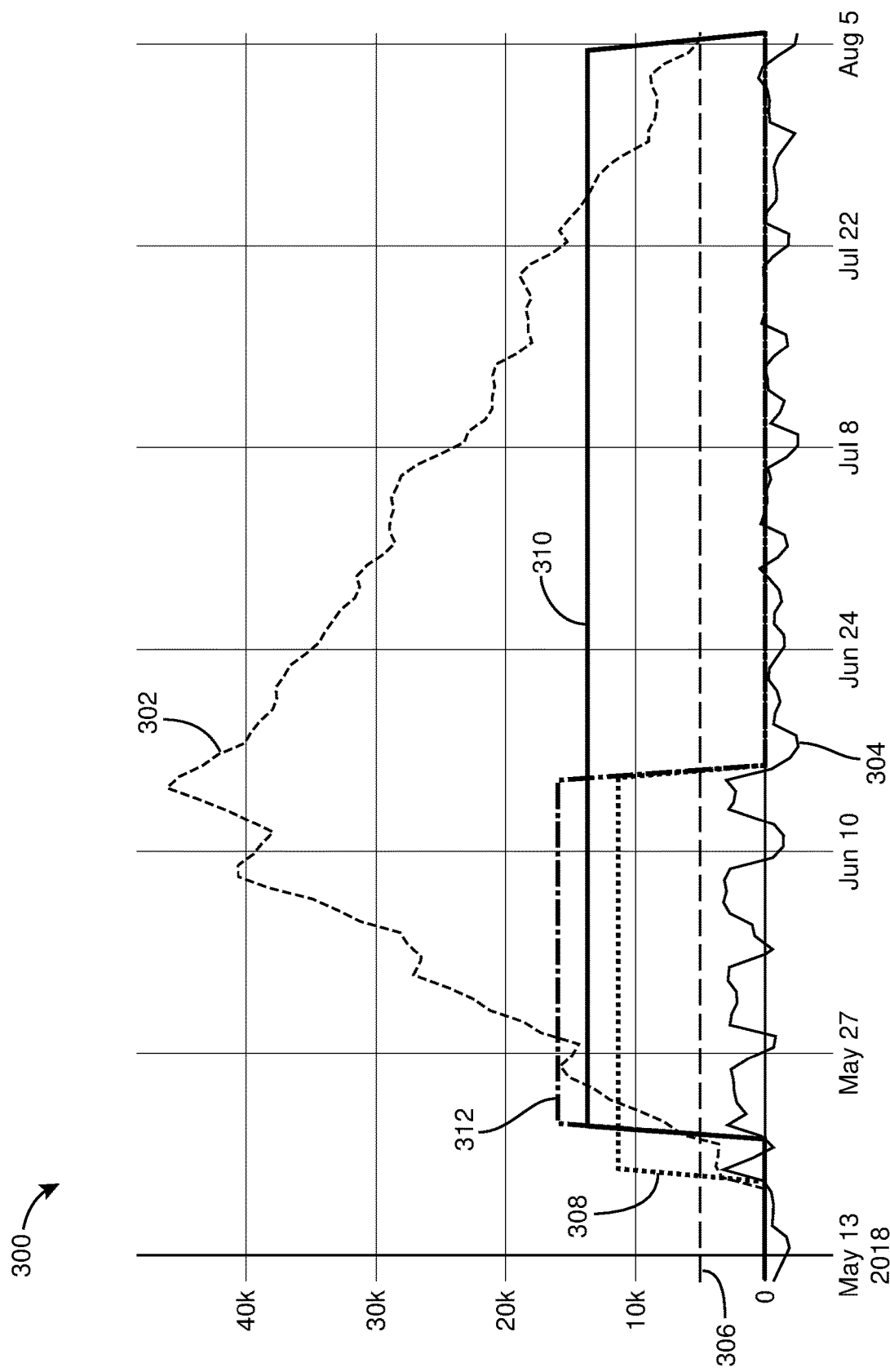
FIG. 3 is a cumulative sum (CUSUM) chart illustrating a time period in which a fault occurred and time periods in which the fault would be detected using various methods, according to an exemplary embodiment.

Referring now to FIG. 3, a cumulative sum (CUSUM) chart 300 illustrating a time period in which a fault occurred and time periods in which the fault would be detected using various methods is shown, according to an exemplary embodiment. CUSUM chart 300 is shown to include a CUSUM 302, an error 304, a fault threshold 306, a fault 308, a detected fault 310, and a second detected fault 312. CUSUM 302 may include cumulative sum values for a point of a BAS for various times (e.g., any metric of time, such as days, minutes, hours, seconds, portions of seconds, etc.). Error 304 may include error values at various times. The cumulative sum values may be aggregated error values that are determined by aggregating the error values of the times associated with the cumulative values and any error values for times occurring before such times. CUSUM 302 may be used to determine when faults for points of the BAS occur. To do so, a processor may compare values of CUSUM 302 to fault threshold 306. Using previously existing methods, the processor may determine that faults end when CUSUM 302 exceeds fault threshold 306 and ends when CUSUM 302 decreases below fault threshold 306. For example, fault 308 may occur between May $15^{th}$ and June $15^{th}$. The processor using such previously existing methods would create CUSUM 302 and determine that the fault began on May $23^{rd}$ and ended on August $5^{th}$. Consequently, the processor would detect that a fault was occurring for a time well after fault 308 ended.

To more accurately determine when faults begin and end, instead of using the time that CUSUM 302 crosses fault threshold 306 as the time that the faults begin, a processor may instead use this time to determine that a fault occurred and analyze cumulative sum values for times occurring before and after it to more accurately determine when the faults begin and end. For example, as represented by second detected fault 312, a processor may determine that fault 308 begins when CUSUM 302 crosses fault threshold 306 and ends when CUSUM 302 reaches a maximum. In another example, a processor may determine that fault 308 began when CUSUM 302 was at a minimum before the time CUSUM 302 crossed fault threshold 306 and ended when CUSUM 302 was at a maximum in which there are no further maximums that exceed a second fault threshold (not shown). By doing so, the processor may more accurately detect the beginning and end of faults to provide accurate data to administrators (e.g., building managers) and/or controllers to control building equipment.

For example, referring now to FIG. 4, a block diagram of a system 400 including a fault detection system 402 that detects the beginning and the end of faults in a processing system is shown, according to an exemplary embodiment. FIG. 4 is described with respect to detecting the boundaries of a building automation system, however, fault detection system 402 may detect the beginning and end of faults of any type of system that experiences faults. For example, fault detection system 402 may detect the beginning and end of faults in vehicles, automated industrial equipment, computer networks, data centers, manufacturing systems (e.g., manufacturing lines), traffic control systems, construction equipment, etc. Fault detection system 402 may detect the beginning and end of faults that occur based on both positive and negative errors that occur over time within a respective system. In addition to fault detection system 402, system 400 is shown to include a user presentation system 424, a building controller 426, and building equipment 428. Each of components 402 and 422-428 may communicate over a synchronous or an asynchronous network.

Fault detection system 402 may include a processing circuit 404, a processor 406, and a memory 408. Processing circuit 404, processor 406, and/or memory 408 can be the same as, or similar to, processing circuit 204, processor 206, and/or memory 208 as described with reference to FIG. 2. Memory 408 is shown to include a building data collector 410, a CUSUM analyzer 412, a fault beginning detector 414, a fault end detector 416, a negative fault detector 418, a fault aggregator 420, and a building data database 422, in some embodiments. In brief overview, fault detection system 402 may be configured to obtain a model indicating an expected or normal state of operation of a building system including expected values of various points of the building system over time. Fault detection system 402 may obtain actual values corresponding to the expected values and generate cumulative sum values indicating a cumulative sum of error over time between the expected values and corresponding actual values. Fault detection system 402 may identify a time in which the cumulative sum of error reaches a threshold (e.g., a fault threshold) to determine that a fault occurred. Fault detection system 402 may analyze data before and after the identified time to determine when the fault began and ended. Fault detection system 402 may provide data indicating times that the fault occurred to building controller 426 to control building equipment 428.

Building data collector 410 can include instructions performed by one or more servers or processors (e.g., processing circuit 404), in some embodiments. In some embodiments, building data collector 410 may be configured to collect building data from building equipment 428 and/or building data from building data database 422. Building data collector 410 may collect building data related to various points of BAS 200 such as, but not limited to, building energy consumption, building occupancy, temperature, pressure, humidity, etc. Building data collector 410 may collect such data in real time from various sensors of BAS 200 as the sensors generate the data or from building data database 422. Building data collector 410 may collect the data from the sensors via local gateways that are connected to a network. The gateways may receive the data and format it into a machine-readable format and transmit it to fault detection system 402 for processing and/or storage.

Building data collector 410 may receive data from BAS 200 upon polling the sensors or automatically as the sensors send the data to fault detection system 402. Building data collector 410 may poll the sensors at set intervals, pseudo-randomly, or in response to receiving an input from an administrator. Alternatively, the sensors of BAS 200 may automatically transmit data to building data collector 410 at set intervals or pseudo-randomly or in response to an input from an administrator. The building data may be associated with one or more timestamps that indicate a time that the data was generated and/or a time that fault detection system 402 received the data. In some embodiments, the values are part of a timeseries including a device identifier associated with the values, times that the values are generated or received, and/or metadata indicating with which point the values are associated. Once building data collector 410 receives the building data, building data collector 410 may store the data in building data database 422.

Further, building data collector 410 may receive predicted values of a point of building system 200 over time. The predicted values may be a part of a normative model that predicts values for a point for various future points in time (e.g., every hour, daily, weekly, monthly, etc.). Building data collector 410 may receive or retrieve the values from external data source providers (e.g., a weather forecaster) or from a model built by an administrator that is otherwise associated with BAS 200. Building data collector 410 may receive the values and store them in building data database 422 indicating the time/day with which they are associated.

Building data database 422 can be a dynamic database including data inputs that building data database 422 receives from building equipment 428 and from various other sources (e.g., data source providers). Building data database 422 can be a graph database, MySQL, Oracle, Microsoft SQL, PostgreSql, DB2, document store, search engine, key-value store, etc. Building data database 422 may be configured to hold any amount of data and can be made up of any number of components, in some embodiments. In some embodiments, building data database 422 is a cloud database that collects and stores data from other building automation systems. Building data database 422 may be configured to store predicted values of various points of BAS 200 that are associated with a normal state of operation of building equipment 428. The predicted values may be associated with a predictive model generated by a data source provider or another component of BAS 200. Building data database 422 may be configured to include predicted values for any number of points of BAS 200. For example, building data database 422 may be configured to store predicted values associated with building energy consumption, building occupancy, temperature, pressure, humidity, chiller cooling capacity, lighting, etc. Additionally, building data database 422 may be configured to store predicted data related to building security systems. For example, building data database 422 may store closed circuit TV (CCTV) data, register transfer level (RTL) based access door data, etc.

Building data database 422 may also be configured to include actual values that correspond to predicted values for various times. Building data database 422 may receive the actual values directly from building equipment 428 or from building data collector 410. In some instances, building data database 422 may include values associated with the points as timeseries data. Each timeseries can include a series of values for the same point and a timestamp for each of the data values. For example, a timeseries for a point provided by a temperature sensor can include a series of temperature values measured by the temperature sensor and the corresponding times at which the temperature values were measured. Timeseries may be generated by building data collector 410. An example of a timeseries which can be generated by the building data collector 410 is as follows:

[<key, timestamp1, value1>, <key, timestamp2, value2>, <key, timestamp3, value3>]

where key is an identifier of the source of the raw data samples (e.g., timeseries ID, sensor ID, device ID, etc.), timestamp, may identify the time at which the ith sample was collected, and value, may indicate the value of the ith sample. The time stamps may be associated with any unit of time (e.g., weeks, days, hours, minutes, seconds, portions of seconds, etc.). CUSUM analyzer 412 may be configured to retrieve data from building data database 422 and generate cumulative sum values indicating summed error values over a period of time. CUSUM analyzer 412 can hold any amount of predicted and/or actual building data. Such data can be added or removed from building data database 422 at any time.

In instances in which fault detection system 402 operates to detect non-building automation system related faults, fault detection system 402 may store data related to the system. For example, fault detection system 402 may be configured to store data related to data centers, computer networks, manufacturing systems, cars, constructions equipment, televisions, traffic systems, phone networks, etc. Fault detection system 402 may store both predicted data and actual data related to each or a portion of each system to detect any faults in the system.

CUSUM analyzer 412 can include instructions performed by one or more servers or processors (e.g., processing circuit 404), in some embodiments. In some embodiments, CUSUM analyzer 412 is configured to generate cumulative sum values indicating the cumulative error of values of a point over time. To generate the cumulative sum values, CUSUM analyzer 412 may perform a CUSUM analysis based on actual values of building data and corresponding (e.g., associated with the same date or time in the same or a different time series) predicted values of building data associated with a time period. To perform the CUSUM analysis, CUSUM analyzer 412 may compare the actual building data and the corresponding predicted building data that is associated with the same time or date to determine positive or negative differences between corresponding values. Each difference may be associated with a date or time (e.g., the time of a correlated timestamp of a timeseries value). CUSUM analyzer 412 may determine differences for any number of times or dates. After determining the differences, CUSUM analyzer 412 may compare the differences to a threshold. If the difference of a particular time exceeds the threshold (e.g., an error threshold), CUSUM analyzer 412 may determine the amount that the difference exceeds the threshold to be an amount of error that is associated with the particular time. If the difference is less than the threshold, CUSUM analyzer 412 may determine the amount that the difference is less than the threshold to be an amount of relative negative error that is associated with the particular time.

For example, CUSUM analyzer 412 may determine an actual amount of energy that BAS 200 consumed for May $1^{st}$. CUSUM analyzer 412 may compare the actual amount of energy to a predicted amount of energy for the same day. CUSUM analyzer 412 may receive or retrieve the predicted amount of energy and/or the actual amount of energy from building data database 422. CUSUM analyzer 412 may obtain a difference between the two values. CUSUM analyzer 412 may compare the difference to a threshold and determine an error value to be a second difference between the difference and the threshold. The error value may be positive if the second difference is positive and/or relatively negative if the second difference is less than the threshold.

CUSUM analyzer 412 may aggregate the error values over time to generate the cumulative sum values. CUSUM analyzer 412 may aggregate successive error values over time to obtain cumulative sum values for various dates or times to generate the cumulative sum values. For example, CUSUM analyzer 412 may identify a first error value of a first time and aggregate the first error value of the first time with a second error value of a subsequent second time to obtain a cumulative sum value associated with the second time. In some embodiments, the first error value is a cumulative sum value associated with error that occurred before and during the first time. Consequently, the cumulative sum value of the second time may be an aggregation of the error that occurred before and, in some cases, during the second time. CUSUM analyzer 412 may determine cumulative sum values for each time that occurred before the second time. CUSUM analyzer 412 may aggregate the error values to obtain cumulative sum values for any time period. CUSUM analyzer 412 may generate a CUSUM chart that including cumulative sum values over a time period illustrating how values of the cumulative sum values change over time.

In some embodiments, CUSUM analyzer 412 may generate cumulative sum values indicating cumulative sum values of a point of BAS 200 over time related to negative values of error. For example, CUSUM analyzer 412 may determine negative errors in which the actual values of the point are below the corresponding predicted values of the point by an amount that exceeds a threshold (e.g., an absolute value of the negative error exceeds an absolute value of a negative threshold). CUSUM analyzer 412 may determine the negative errors for successive times or dates and generate a CUSUM chart with the negative errors similar to how CUSUM analyzer 412 generated the CUSUM chart with the positive errors. In some embodiments, CUSUM analyzer 412 may generate cumulative sum values associated with both negative and positive errors over the same time period and display the cumulative sum values on a same CUSUM chart.

Advantageously, CUSUM charts may be used by an administrator to identify faults of a point of BAS 200. If the cumulative sum values of a point increase by too much (e.g., by an amount exceeding a threshold) over a specific time period, the administrator may identify that a fault occurred that is specific to the point. As described below, in some embodiments, fault detection system 402 automatically detects times that such faults begin and/or end and present this data to the administrators. Because cumulative sum values may be generated for both positive and negative errors, an administrator may be able to view faults that are associated with both positive and negative faults.

Fault beginning detector 414 can include instructions performed by one or more servers or processors (e.g., processing circuit 404), in some embodiments. In some embodiments, fault beginning detector 414 is configured to detect when faults in a point of BAS 200 begin. Fault beginning detector 414 may detect the beginning of a fault using various methods. In some embodiments, fault beginning detector 414 detects the beginning of faults by comparing cumulative sum values to a threshold and determining a time in which a cumulative sum value reaches (e.g., becomes equal to or crosses above) the threshold. Fault beginning detector 414 may identify the time that the cumulative sum reaches the threshold to be the time that a fault began. However, in some embodiments, fault beginning detector 414 may identify the time that the cumulative sum reaches the threshold to be an indication that a fault occurred within a time period and analyze the cumulative sum values associated with times occurring before the identified time in which the cumulative sum values reach the threshold to identify the beginning of the fault.

In some embodiments, to analyze the cumulative sum values that are associated with times before the identified time, fault beginning detector 414 identifies a time of a local minimum of the cumulative sum values associated with a time before the time that the cumulative sum values reach the threshold. The local minimum may be a cumulative sum value associated with a derivative of zero (or an amount lower than a threshold) and is lower than the next and the previous cumulative sum value. In some instances, there may be more than one local minimum occurring before the time that the cumulative sum value reaches the threshold. Fault beginning detector 414 may identify the local minimum that occurred most recently before the time that the cumulative sum values reach the threshold. Fault beginning detector 414 may determine that the time of the identified local minimum is the time that the fault began.

For example, fault beginning detector 414 may identify that a cumulative sum value for a humidity point of BAS 200 reaches a threshold on June $2^{nd}$. Fault beginning detector 414 may analyze or evaluate cumulative sum values associated with each day previous to June $2^{nd}$, until January $1^{st}$. Fault beginning detector 414 may identify each local minimum of the cumulative sum values between January $1^{st}$ and June $2^{nd}$ and/or identify the local minimum that is associated with the closest day to June $2^{nd}$. Fault beginning detector 414 may determine the day associated with the identified local minimum to be the day that a fault began in the humidity point began. In another example, fault beginning detector 414 may identify a fault that occurred for a humidity point within a single day. For example, fault beginning detector 414 may evaluate times.

In some embodiments, to analyze the cumulative sum values that are associated with times occurring before the identified time, fault beginning detector 414 may analyze cumulative sum values going backward in time from the identified time. Fault beginning detector 414 may analyze each value and determine if any of the values did not decrease from the previously analyzed value. Fault beginning detector 414 may do so until identifying an increasing value that is either the same or higher than the previously analyzed value. Fault beginning detector 414 may determine the previously analyzed value is at a minimum and, consequently, that the fault began at the time associated with the previously analyzed value.

For example, fault beginning detector 414 may analyze cumulative sum values including a cumulative sum value for a CCTV network operating time that reaches a threshold on October $2^{nd}$. Fault beginning detector 414 may analyze the cumulative sum values associated with days before October $2^{nd}$ by identifying the cumulative sum value associated with October $1^{st}$, identifying the cumulative sum value associated with September $30^{th}$, identifying the cumulative sum value associated with September $29^{th}$, etc. Fault beginning detector 414 may identify the cumulative sum value for any number of days. Fault beginning detector 414 may identify and compare each cumulative sum value with the previously identified cumulative sum value (e.g., the cumulative sum value associated with the next day on a calendar). Fault beginning detector 414 may continue to identify cumulative sum values until determining that the cumulative sum value either increased or remained the same from the previously identified cumulative sum value. Fault beginning detector 414 may determine that a fault began at the time associated with the previously identified cumulative sum value. Continuing with the example above, fault beginning detector 414 may determine that the cumulative sum value for August $1^{st}$ was higher than or equal to the cumulative sum value for August $2^{nd}$. Consequently, fault beginning detector 414 may determine that the fault related to the CCTV network began on August $2^{nd}$.

In some embodiments, fault beginning detector 414 may compare a difference between consecutive cumulative sum values to a threshold to identify the beginning of a fault. For example, fault beginning detector 414 may identify cumulative sum values for the energy consumption of a building for August $5^{th}$ and August $6^{th}$. Fault beginning detector 414 may determine a difference between the cumulative sum values by subtracting the cumulative sum value for August $5^{th}$ from August $6^{th}$ to obtain a difference. Fault beginning detector 414 may compare the difference to a threshold. If fault beginning detector 414 determines that the difference exceeds the threshold, fault beginning detector 414 may determine that the fault occurred on August $6^{th}$. Otherwise, fault beginning detector 414 may continue to determine differences in cumulative values for successive days until identifying a difference that exceeds a threshold. Advantageously, by implementing the threshold, fault beginning detector 414 may avoid falsely identifying plateaus of cumulative sum values as times that faults occur instead of the actual local minimum that occurred at a time before the plateau.

In some embodiments, to identify the local minimum that is associated with the time closest to the time that a cumulative sum reached a threshold, fault beginning detector 414 may perform a gradient descent analysis. The gradient descent analysis may include iteratively determining gradients (e.g., a slope of a tangent line to a cumulative sum value on a CUSUM chart, differences between next and/or cumulative sum values, etc.) for various values of the cumulative sum values until determining that a gradient is zero or lower than a predetermined threshold. For example, in some embodiments, fault beginning detector 414 may identify the time that a cumulative sum value reached a threshold. Fault beginning detector 414 may determine a gradient associated with the time and/or value. Fault beginning detector 414 may multiply the gradient by a constant to obtain a scaled gradient. Fault beginning detector 414 may subtract the scaled gradient from the time that the cumulative sum value reaches the threshold to obtain a new time. Fault beginning detector 414 may determine a gradient for the new time and compare it to a threshold. If fault beginning detector 414 determines the gradient exceeds the threshold, fault beginning detector 414 may repeat the process until determining a gradient is equal to zero or is otherwise less than the threshold. Fault beginning detector 414 may determine that a cumulative sum value associated with a gradient that is equal to zero or that is otherwise less than the threshold to be a local minimum. An example formula that fault beginning detector 414 may use to determine new times in the process is reproduced below.

$$t_k = t_{k-1} - \lambda \Delta S|_{t_{k-1}}$$

In some cases, k may be associated with a step number in the analysis. $t_k$ may be the time associated with step k. $t_{k-1}$ may be the time associated with a previous step. $S_t$ may be a cumulative error value for a time t. $\Delta S|_{t_{k-1}}$ may be the gradient or an estimate of the gradient of the cumulative error value at the time associated with a previous step $t_{k-1}$. $\lambda$ may be a normalizing/scale factor to normalize or scale values for S (e.g., cause them to be within the range [0,1]). $\lambda$ may also be implemented to tune the magnitude of the gradients. In some embodiments, for at least a portion of the iterations for determining a new time, $\lambda$ decreases between iterations so the cumulative error values may converge to the local minimum. Advantageously, by decreasing the value of $\lambda$ over the iterations, the cumulative error values may gradually converge to the local minimum instead of making large leaps between various times. An example of an implementation of backward gradient descent is described in detail below with reference to FIG. 7.

In some embodiments, fault beginning detector 414 may perform a smoothing operation on various cumulative sum values before performing any of the processes described above to determine a most recent minimum of the cumulative sum values. Fault beginning detector 414 may perform the smoothing operation by using a sliding averaging window that continuously takes the average of multiple cumulative sum values over time. Fault beginning detector 414 may take the averages of cumulative sum values in small windows over each or a portion of the cumulative sum values to generate smoothed cumulative sum values including averaged cumulative sum values. Once fault beginning detector 414 creates the smoothed cumulative sum values, fault beginning detector 414 may determine the minimum of the smoothed cumulative sum values using any of the techniques described above. Advantageously, by identifying a minimum of the smoothed cumulative sum values, fault beginning detector 414 may avoid identifying small irregularities such as a small plateau as minimums and instead identify an averaged minimum as the minimum.

In some embodiments, after fault beginning detector 414 identifies a minimum that occurred at a time closest to the time that a cumulative sum value reaches the threshold, fault beginning detector 414 may verify that the minimum is associated with the beginning of the fault. To do so, fault beginning detector 414 may identify cumulative sum values associated with times occurring after the time associated with the identified minimum. Fault beginning detector 414 may identify any number of values. Fault beginning detector 414 may identify the values and determine if the values are increasing from the identified minimum. If fault beginning detector 414 determines the values are increasing, fault beginning detector 414 may verify that the minimum is correct. Otherwise, fault beginning detector 414 may continue to analyze the cumulative sum values associated with times before the previously identified minimum.

For example, fault beginning detector 414 may identify that a fault began on June $1^{st}$. Fault beginning detector 414 may identify cumulative sum values for June $3^{rd}$ and June $5^{th}$. In some embodiments, fault beginning detector 414 may compare the cumulative sum values for June $3^{rd}$ and June $5^{th}$ and determine if they are both higher than the cumulative sum value for June $1^{st}$. If they both are higher, fault beginning detector 414 may verify that the fault occurred on June $1^{st}$. Otherwise, fault beginning detector 414 may continue to analyze cumulative sum values for days before June $1^{st}$ to determine the beginning of the fault. Fault beginning detector 414 may identify cumulative sum values for any number of days after the minimum to verify that the minimum is accurate. Further, fault beginning detector 414 may ensure that the cumulative sum values are within a threshold number of days to most accurately verify the beginning of the fault.

In some embodiments, instead of determining if the identified values after the minimum are all higher than the minimum, fault beginning detector 414 determines if the values are increasing over time. Continuing with the example above, in some embodiments, instead of determining whether the cumulative sum values for June $3^{rd}$ and June $5^{th}$ are higher than the cumulative sum value on June $1^{st}$, fault beginning detector 414 may determine if the cumulative sum value is increasing across the days. Fault beginning detector 414 may verify that the fault began on June $1^{st}$ by determining if the cumulative sum value for June $3^{rd}$ is higher than the cumulative sum value for June $1^{st}$ and/or that the cumulative sum value for June $5^{th}$ is higher than the cumulative sum value for June $3^{rd}$. If fault beginning detector 414 determines that the values are increasing, fault beginning detector 414 may determine that June 1$^{st}$ is the correct minimum. Otherwise, fault beginning detector 414 may search for a minimum occurring before June 1$^{st}$ Once fault beginning detector 414 determines that a fault occurred and/or when the fault began, fault end detector 416 may determine when the fault ended.

Fault end detector 416 includes instructions performed by one or more servers or processors (e.g., processing circuit 404), in some embodiments. In some embodiments, fault end detector 416 is configured to detect when faults in a point of BAS 200 end. Fault end detector 416 may detect the end of a fault using various methods. In some embodiments, fault end detector 416 detects the end of faults by comparing cumulative sum values to a threshold and determining a time in which a cumulative sum value reaches (e.g., becomes equal to or crosses below) the threshold. Fault end detector 416 may identify the time that the cumulative sum reaches the threshold to be the time that a fault ended. However, in some embodiments, fault end detector 416 may use an adaptive CUSUM analysis to more accurately determine the end of the fault.

In some embodiments, to perform the adaptive CUSUM analysis, fault end detector 416 identifies the time in which a cumulative sum value reaches the threshold and detects an interval of time in which cumulative sum values decrease consistently until going below the threshold. Cumulative sum values may decrease consistently when sequential cumulative sum values have a negative gradient within a predetermined range of each other or differ by similar amounts (e.g., by amounts within a range). In some embodiments, fault end detector 416 requires a threshold number of values to be decreasing consistently to identify ends of faults to be at the beginning of the sequential cumulative sum values. The threshold may be any number of values. For example, fault end detector 416 may identify 10 sequential cumulative sum values that differ by similar amounts and determine that they are consistently decreasing. If the values consistently decrease to the threshold, fault end detector 416 may determine that the first value of the 10 sequential cumulative sum values is the end of the fault. In some cases, fault end detector 416 may not be able to identify a period of time in which values consistently decrease across the threshold. In such cases, fault end detector 416 may identify the time that a cumulative sum value crossed the threshold to be the end of the fault.

In some embodiments, to identify values in which sequential cumulative sum values consistently decrease until they cross below the threshold, fault end detector 416 performs a smoothing operation on the cumulative sum values to obtain smoothed cumulative sum values. Fault end detector 416 may perform the smoothing operation similar to how fault beginning detector 414 performs the smoothing operation. Fault end detector 416 may perform the smoothing operation and determine a period of time in which cumulative sum values of the smoothed cumulative sum values consistently decrease to identify the end of the fault. Advantageously by using the smoothing operation to smooth the cumulative sum values, fault end detector 416 may be able to ignore abnormalities in how the building is operating that are not associated with a fault but that might otherwise stop fault end detector 416 from identifying the end of the fault.

In some embodiments, to identify the end of a fault, fault end detector 416 may identify the global maximum, or, in some cases, the first local maximum occurring after a cumulative sum value reaches the threshold, of the cumulative sum values and separately analyze any local maximums that occur after the global maximum. The global maximum may be the highest cumulative sum value of the cumulative sum values. The local maximums may be values that are higher than values that are associated with one or more times before and after the time of the local maximum. In some embodiments, fault end detector 416 determines that faults end at the global maximum of the cumulative sum values. In some embodiments, fault end detector 416 determines the height of the local maximums that occur after the global maximum and compares the height of the local maximums to a threshold. In some embodiments, the threshold has the same value as the fault threshold that fault beginning detector 414 uses to determine whether a fault has occurred. If none of the heights are higher than the threshold, fault end detector 416 may determine that the fault ended at the global maximum. Otherwise, if fault end detector 416 identifies a local maximum with a height that exceeds the threshold, fault end detector 416 may determine that the fault lasted until at least the identified local maximum.

Figure 10:
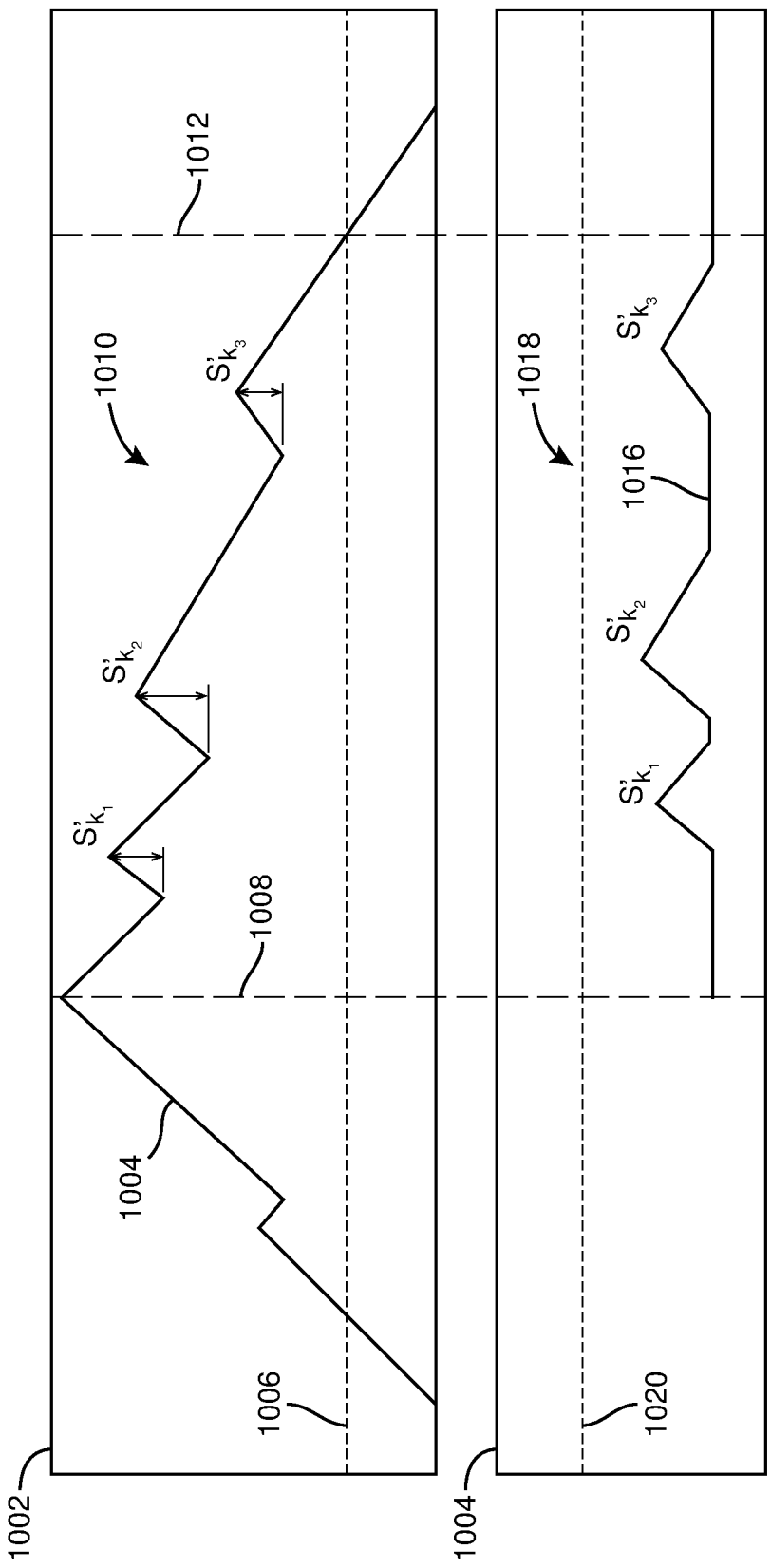
FIG. 10 includes two CUSUM charts illustrating an adaptive CUSUM analysis, according to an exemplary embodiment.

In some embodiments, the heights of the local maximums are the differences between the values of the local minimums immediately previous to the local maximums and the values of the respective local maximums. In some embodiments, to determine the height of the local maximums, fault end detector 416 performs a CUSUM analysis on the values that occur after the global maximum to obtain new cumulative sum values. In some embodiments, as shown in FIG. 10 and as described below, fault end detector 416 may perform the CUSUM analysis, so that cumulative sum values of the new cumulative sum values cannot go below zero. Instead of going below zero, the cumulative sum values may remain at zero until the error of values is positive and the cumulative sum values increase. In such embodiments, the heights of the local maximums of the cumulative sum analysis are the values at the local maximums of the new cumulative sum values. Advantageously, by restricting cumulative sum values from decreasing below zero, fault end detector 416 may more easily identify the height of the local maximums as the value at the local maximums without identifying local minimums before and/or after the local maximums.

In some embodiments, fault end detector 416 may compare the heights of each local maximum of the new cumulative sum values to the threshold. If fault end detector 416 identifies a local maximum with a height that exceeds the threshold, fault end detector 416 may determine that the fault lasted until at least that local maximum. If fault end detector 416 identifies a local maximum with a maximum that exceeds the threshold, fault end detector 416 may perform another CUSUM analysis for the times after the identified local maximum to determine if there are any more local maximums with a value that exceeds the threshold. In some embodiments, fault end detector 416 identifies the local maximum with the largest height of the local maximums and determines whether the largest height exceeds a threshold. If the largest height exceeds the threshold, fault end detector 416 may perform another CUSUM analysis starting at the local maximum with the largest height. The fault end detector 416 may repeatedly perform CUSUM analyses until it does not identify a local maximum with a value that exceeds the threshold before the cumulative sum values decrease below the threshold.

Negative fault detector 418 can include instructions performed by one or more servers or processors (e.g., processing circuit 404), in some embodiments. In some embodiments, negative fault detector 418 is configured to detect negative faults of BAS 200. Negative faults may be faults that are associated with negative error at various points in time. Negative error may occur when the actual value of a point of BAS 200 is lower than the predicted value of the point by an amount below a threshold. The negative error may be the difference between an amount that the actual value is below the threshold. For example, for a building energy consumption point, negative fault detector 418 may identify a predicted energy consumption for June $4^{th}$ to be 17 kWh. Negative fault detector 418 may identify the actual energy consumption for June $4^{th}$ to be 13 kWh. Negative fault detector 418 may compare the difference of 4 kWh to a threshold of 1 Kwh and determine a negative error to be 3 kWh. Negative fault detector 418 may perform similar operations for any point using any threshold. Negative fault detector 418 may perform similar functions to components 410-416 to identify the beginning and end of negative faults. In some embodiments, components 410-416 perform operations to determine negative faults. Advantageously, by identifying negative faults, fault detection system 402 may identify both positive and negative faults to obtain and provide a more accurate outlook of how BAS 200 is performing to user presentation system 424 and/or building controller 426.

Fault aggregator 420 can include instructions performed by one or more servers or processors (e.g., processing circuit 404), in some embodiments. In some embodiments, fault aggregator 420 may be configured to aggregate the faults that are collectively or individually detected by fault beginning detector 414, fault end detector 416, and/or negative fault detector 418 to identify a total amount of faults that occurred in BAS 200 over a predetermined time period. Fault aggregator 420 may identify the beginning and end of faults to determine a time period in which BAS 200 was experiencing a fault for various points. In some embodiments, fault aggregator 420 may determine whether a fault was occurring at various time-steps. Fault aggregator 420 may aggregate faults over any time period. For example, fault aggregator 420 may identify positive faults along with the time periods in which they occurred for an energy consumption point of a building over the span of a year. Fault aggregator 420 may similarly identify the negative faults for the energy consumption point of the building over the same span. Fault aggregator 420 may provide the aggregated faults to user presentation system 424 to be displayed at a user device and/or to building controller 426 to control building equipment 428.

Fault detection system 402 may provide expected energy outputs to user presentation system 424 and/or building controller 426. In some embodiments, building controller 426 uses the detected faults to operate building equipment 428 (e.g., control environmental conditions of a building, cause generators to turn on or off, charge or discharge batteries, etc.). Further, user presentation system 424 can receive the fault indications and cause a client device to display the indications (e.g., graphical elements, charts, words, numbers, etc.). For example, user presentation system 424 may receive both positive and negative faults associated with the energy consumption of chillers in the previous year. User presentation system 424 may display the positive and negative faults via a CUSUM chart at a client device (not shown). User presentation system 424 may display positive and negative faults through various charts and/or graphs.

In some embodiments, fault detection system 402 utilizes the above techniques to detect faults in systems other than in a building automation system. For example, fault detection system 402 may detect security faults in a computer network by determining differences between a number of viruses or other computer errors that occurred in the computer network over a specific time period and comparing the determined number to an expected numbers of viruses or computer errors to identify security faults. In another example, fault detection system 402 may determine faults in a data center by identifying how much data the data center is storing over time versus how much data the data center was predicted to store. Fault detection system 402 may automatically determine faults occurred (e.g., time periods in which data was not being stored properly such as when the data gets corrupted) based on time periods in which the data center stores less data than expected over a sustained period of time. In yet another example, fault detection system 402 may detect faults in a manufacturing assembly. Fault detection system 402 may compare a number of products that were manufactured over time to the number of products that were predicted to be manufactured using the methods described above. Fault detection system 402 may determine sustained time periods in which the manufacturing line produced less products than was anticipated. Fault detection system 402 may identify the time period as a fault and an administrator can adjust the manufacturing assembly accordingly (e.g., replace manufacturing equipment).

Figure 5:
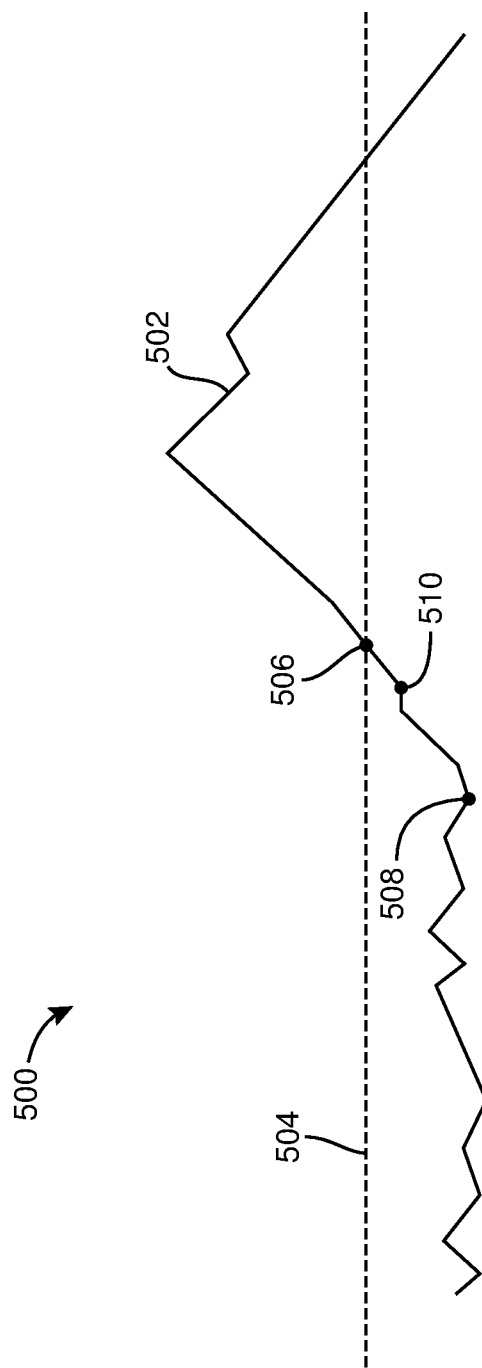
FIG. 5 is a CUSUM chart illustrating a time in which a fault is detected and an analysis of cumulative sum values for times occurring before the time that the fault was detected, according to an exemplary embodiment.

Referring now to FIG. 5, a CUSUM chart 500 illustrating a time that a fault is detected and a CUSUM analysis of values associated with times before the time that the fault was detected is shown, according to an exemplary embodiment. CUSUM charts can be generated to detect errors in systems for any type of system as described above. For example, CUSUM chart 500 may be related to points of a building automation system, data centers, computer networks, manufacturing systems, cars, constructions equipment, televisions, traffic systems, phone networks, etc. CUSUM chart 500 is shown to include a CUSUM 502, a fault threshold 504, a detection time 506, a fault starting time 508, and a plateau 510. CUSUM chart 500 may be a CUSUM chart for any point of a BAS such as, for example, ambient temperature, energy usage of a building or campus, ambient humidity, occupancy, and/or any other point of the building system. CUSUM chart 500 may show the CUSUM over any time period including, for example, a day, a week, a month, a year, etc. Further, the values represented in CUSUM chart 500 may include periodic values associated with seconds, minutes, hours, days, etc. A data processing system (e.g., fault detection system 402, building controller 426, etc.) may create CUSUM chart 500 using actual values and corresponding predicted values over a previous time period as described above.

The data processing system may use CUSUM chart 500 to determine that one or more faults occurred and when the faults began. For example, the data processing system may compare a portion of the values of CUSUM 502 to fault threshold 504 to determine when CUSUM 502 reaches (e.g., is equal to or exceeds) fault threshold 504. The data processing system may detect a fault at the time that the CUSUM 502 reaches the threshold (e.g., detection time 506). Once the data processing system detects the fault, the data processing may analyze values of CUSUM 502 for times occurring before detection time 506 to determine a local minimum in CUSUM 502 that occurred at the closest time to detection time 506. The data processing system may determine and/or verify the local minimum to be at fault starting time 508 using any of the processes described above. By performing any of the processes described above, the data processing system may avoid determining the local minimum to be at plateau 510. Instead, the data processing system may determine that the fault began at fault starting time 508.

In some embodiments, instead of generating or using a CUSUM chart to detect when faults occur, the data processing system analyzes cumulative sum values themselves. For example, cumulative sum values may be generated and/or stored in a spread sheet. The data processing system may use the methods and operations described herein to identify the beginning and ends faults of various points. Consequently, in some embodiments, the system analyzes values that may be used to create the CUSUM chart without creating the CUSUM chart. In some embodiments, the data processing system both generates the CUSUM chart and separately analyzes at least a portion of the values that the data processing system uses to generate the CUSUM chart.

Figure 6:
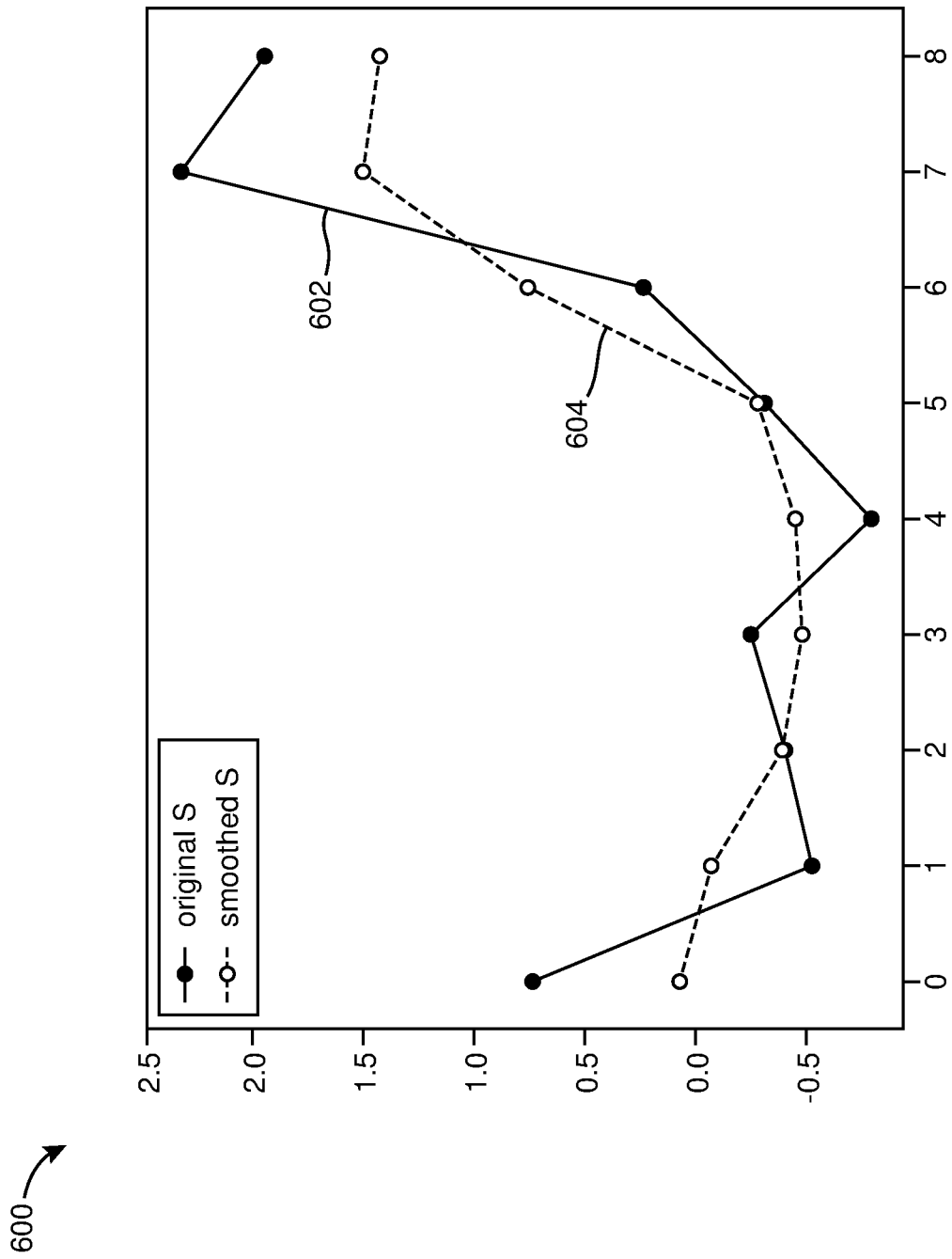
FIG. 6 is a CUSUM chart illustrating a smoothing operation, according to an exemplary embodiment.

Referring now to FIG. 6 is a CUSUM chart 600 illustrating a smoothing operation is shown, according to an exemplary embodiment. The smoothing operation may be performed on CUSUM charts for any type of system. CUSUM chart 600 is shown to include an actual CUSUM 602 and a smoothed CUSUM 604. Smoothed CUSUM 604 may be a fitted line of actual CUSUM 602 that is generated by fault detection system 402 using a sliding averaging window. As can be seen, smoothed CUSUM 604 may have fewer minimums and/or more gradual slopes to the minimums than actual CUSUM 602. Consequently, fault detection system 402 may more accurately identify the minimum of smoothed CUSUM 604 than the minimum of actual CUSUM 602.

For example, fault detection system 402 may generate cumulative sum values for an energy consumption of a BAS over a specific time period. The cumulative sum values may include actual cumulative sum values with multiple minimums and/or plateaus that occur within a small period of time before a value of the actual cumulative sum values reaches a fault threshold indicating that a fault occurred. Because the minimums and/or plateaus occurred within the small period of time, fault detection system 402 may not be able to accurately identify the minimum that is associated with the beginning of the fault. To account for this, fault detection system 402 may use a smoothing function on the actual cumulative sum values to generate smoothed cumulative sum values with one minimum. Fault detection system 402 may identify the minimum of the smoothed cumulative sum values using the techniques described herein and determine that the minimum is associated with the time that the fault began.

Figure 7:
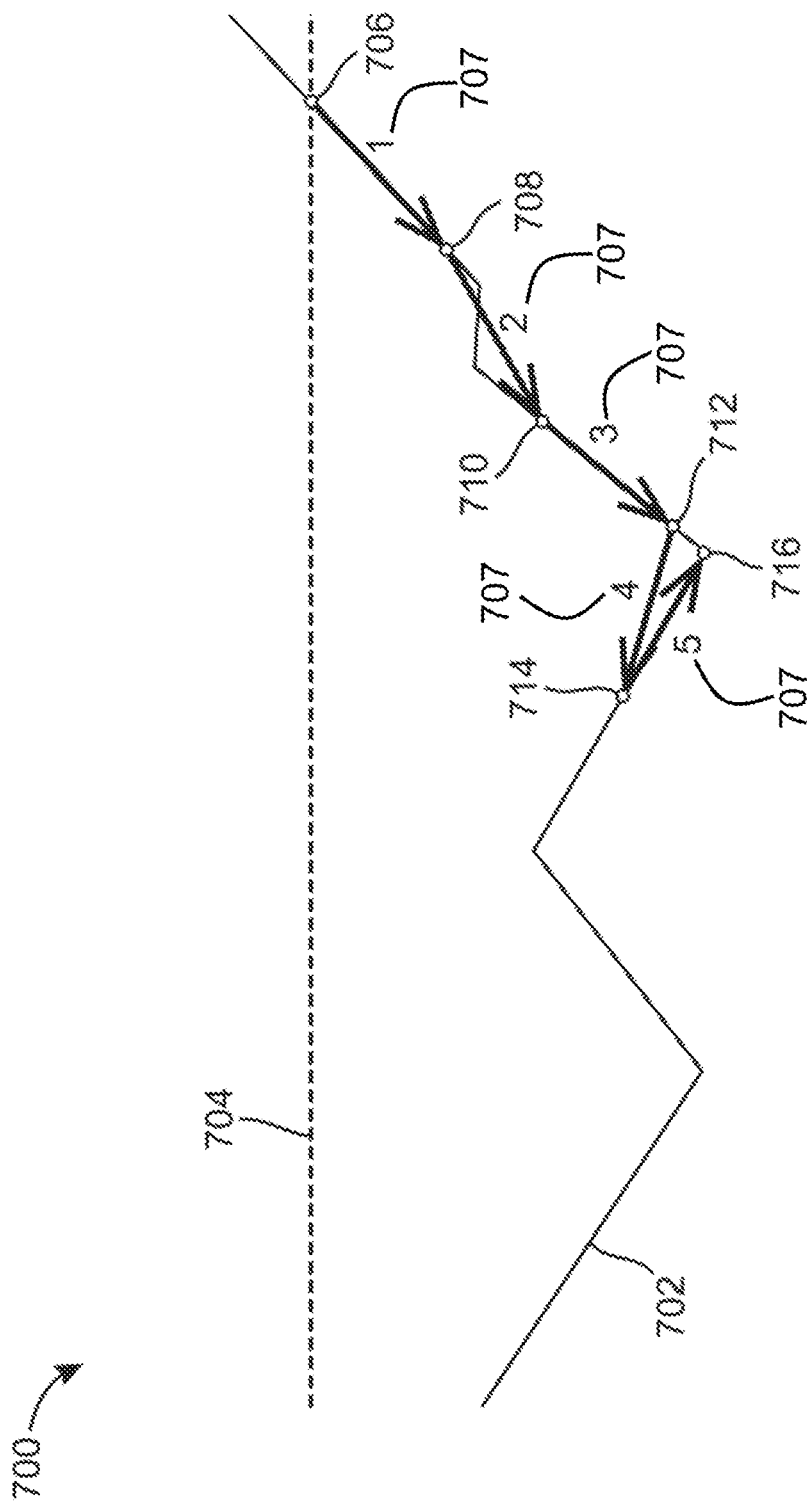
FIG. 7 is a CUSUM chart illustrating a gradient descent analysis, according to an exemplary embodiment.

Referring now to FIG. 7, a CUSUM chart 700 illustrating a gradient descent analysis is shown, according to an exemplary embodiment. CUSUM chart 700 is shown to include a CUSUM 702, a fault threshold 704, a fault indication time 706, a series of gradient steps 707, and a local minimum 716. CUSUM chart 700 may be associated with any point of a BAS. As described above, fault detection system 402 may generate CUSUM chart 700 using actual and predicted values of a point. Fault detection system 402 may identify fault indication time 706 by comparing values of CUSUM 702 with fault threshold 704 to identify any times in which CUSUM 702 reaches fault threshold 704. Fault indication time 706 may be a time that CUSUM 702 identified as being associated with a time that CUSUM 702 reaches fault threshold 704. Upon determining that CUSUM 702 reaches fault threshold 704, fault detection system 402 may determine that a fault occurred and analyze (e.g., use backward gradient descent analysis) on the values of CUSUM 702 occurring before fault indication time 706. Gradient descent analysis may be performed to detect the beginning of faults for any type of system.

To perform the backward gradient descent analysis, fault detection system 402 may make a series of gradient steps represented as series of gradient steps 707 in CUSUM chart 700. To do so, fault detection system 402 may first identify the gradient of CUSUM 702 at fault indication time 706. Fault detection system 402 may multiply the gradient by a variable, $\lambda$, to obtain a scaled gradient. Fault detection system 402 may subtract the scaled gradient from fault indication time 706 to obtain a second time 708. Fault detection system 402 may determine a gradient of CUSUM 702 at second time 708. In some embodiments, fault detection system 402 may compare the gradient to a threshold. If fault detection system 402 determines the gradient exceeds the threshold, fault detection system 402 may multiply the gradient by $\lambda$ to obtain another scaled gradient and subtract the scaled gradient from second time 708 to determine a third time 710. In some embodiments, $\lambda$ may be smaller when determining the second scaled gradient than the first scaled gradient. Consequently, the steps that are made between various times may slowly decrease to converge to local minimum 716. Fault detection system 402 may repeat the above steps to determine a fourth time 712, a fifth time 714, and/or a sixth time associated with local minimum 716. Fault detection system 402 may determine that the fault began at the time associated with local minimum 716. Advantageously, fault detection system 402 may determine the local minimum without overshooting the local minimum that is closest to fault indication time 706.

Figure 8:
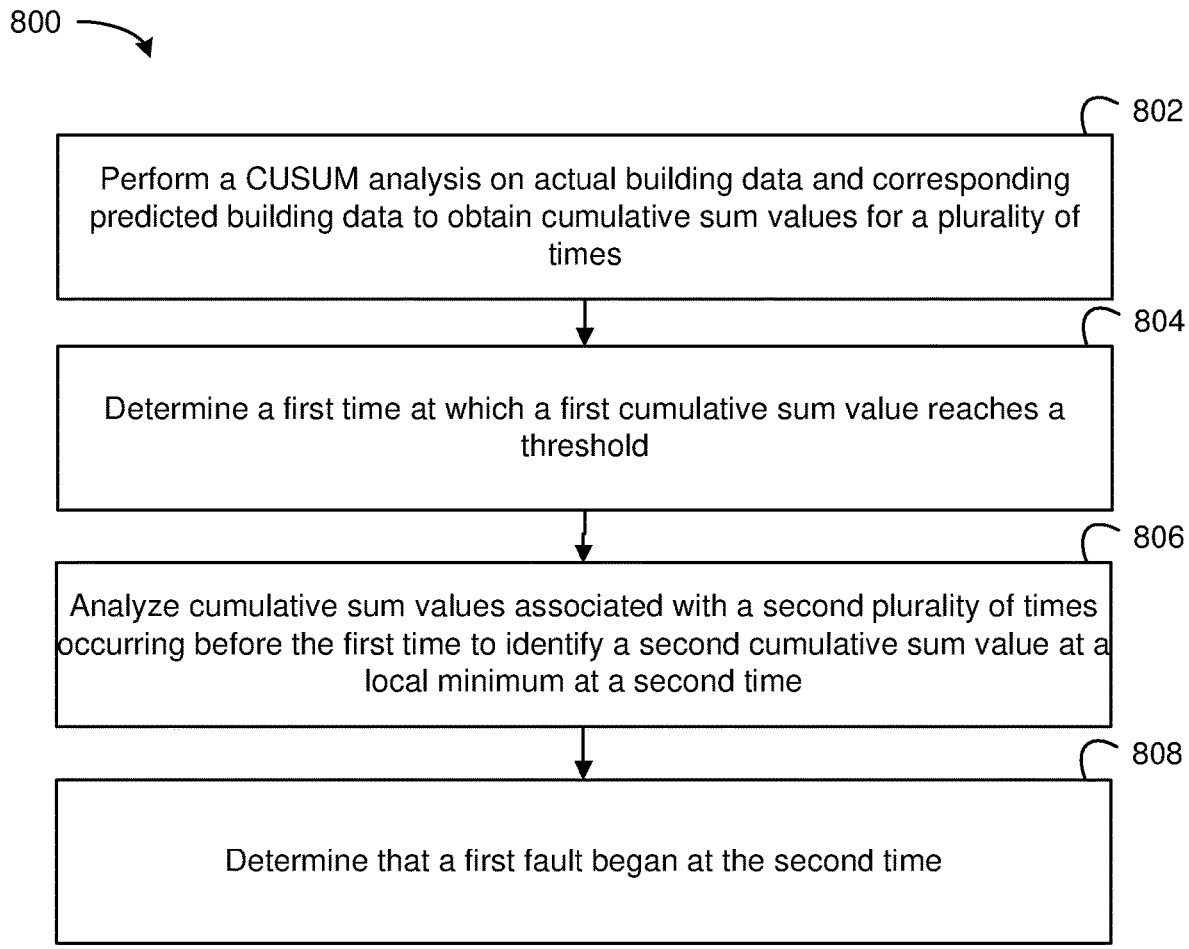
FIG. 8 is a flow diagram of a process for detecting a beginning of a fault, according to an exemplary embodiment.

Referring now to FIG. 8, a flow diagram of a process 800 for detecting a beginning of a fault is shown, according to an exemplary embodiment. Any system or device described herein can be configured to perform some and/or all of process 800. In some embodiments, fault detection system 402 is configured to perform some and/or all of the steps of process 800. For example, components of fault detection system 402 may be configured to perform process 800. Furthermore, building controller 426 can be configured to perform some and/or all of process 800. Advantageously, by performing process 800, fault detection system 402 may be able to accurately identify the beginning of faults that occurred related to various points of a building automation system or any other type of system as described above with reference to FIGS. 4-7.

In step 802, fault detection system 402 may perform a CUSUM analysis on actual building data and corresponding predicted building data to obtain cumulative sum values for multiple times or time-steps, in some embodiments. Cumulative sum values may be cumulative error values for the aggregated error of a point of a BAS for time-steps up to and, in some cases, including the time associated with the cumulative sum value. The multiple times may be any portion of cumulative sum values that occur before the first time. Fault detection system 402 may perform the CUSUM analysis over any time period. For example, to perform the CUSUM analysis, fault detection system 402 may compare corresponding values of actual building data and corresponding predicted building data to obtain a difference between the values. Fault detection system 402 may compare each difference to a threshold to determine an error that is associated with each value. The error may be positive or relatively negative. Fault detection system 402 may use the error values to determine cumulative sum values for various times in a time period.

Fault detection system 402 may generate a CUSUM chart including CUSUM values using the determined error values. The CUSUM values may be aggregated error values of a point across a time period. The CUSUM chart may include aggregated error values based on the error values associated with previous times. For example, fault detection system 402 may determine error values for a first time, a second time after the first time, and a third time after the second time. Fault detection system 402 may determine cumulative sum values for each of the times. To do so, fault detection system 402 may determine that the cumulative sum value for the first time is the error value for the first time. Fault detection system 402 may determine the cumulative sum value for the second time to be an aggregation of the error values for the first and the second time. Fault detection system 402 may determine the cumulative sum value for the third time to be an aggregation of the error values between the first, second, and third time. Fault detection system 402 may determine cumulative sum values for any number of times. In this way, fault detection system 402 may generate a CUSUM chart including cumulative sum values.

In step 804, fault detection system 402 may determine a first time at which a first cumulative sum value reaches a threshold. The threshold may be a predetermined threshold as determined by an administrator. Fault detection system 402 may compare any number of values of the CUSUM to the threshold to determine when/if the CUSUM reaches (e.g., exceeds or becomes equal to) the threshold. Fault detection system 402 may determine that the first time is the time that the CUSUM reaches the threshold. In some embodiments, fault detection system 402 may determine that a fault occurred based on the CUSUM reaching the threshold. In some embodiments, fault detection system 402 may determine that a fault occurred at the first time based on the CUSUM reaching the threshold at the first time.

In step 806, fault detection system 402 may analyze cumulative sum values associated with a second plurality of times occurring before the first time to identify a second cumulative sum value at a local minimum at a second time, in some embodiments. Fault detection system 402 may analyze the cumulative sum values for times occurring before the first time using various processes. For example, fault detection system 402 may analyze the cumulative sum values by identifying values of the cumulative sum values starting at the first time and going backward in time and determining whether the values are decreasing or increasing across time. Fault detection system 402 may continue to identify times occurring before the first time until it identifies an increase in a cumulative sum value from a previously identified cumulative sum value (e.g., identifies that a cumulative sum value from one day is higher than the cumulative sum value of the next day on the calendar). Fault detection system 402 may identify a second time associated with the previously identified cumulative sum value.

Further, in some embodiments, to avoid identifying plateaus in the cumulative sum value (e.g., periods of time where there is not any or there are small amounts of error), fault detection system 402 may compare the increase in cumulative sum values to a threshold. If fault detection system 402 determines the increase does not exceed the threshold, fault detection system 402 may continue to analyze the values until it identifies an increase in cumulative sum values. Otherwise, fault detection system 402 may identify the second time as the time associated with the previously identified cumulative sum value.

In some embodiments, fault detection system 402 may analyze the cumulative sum values by performing a backward gradient descent analysis. Fault detection system 402 may iteratively determine gradients (e.g., a slope of a tangent line at a time of a cumulative sum value on a CUSUM chart, differences between previous and/or next values of a cumulative sum value, etc.) for various times of the cumulative sum values until determining that a gradient is zero or lower than a predetermined threshold. For example, in some embodiments, fault detection system 402 may identify the time that a cumulative sum value reaches a threshold. Fault detection system 402 may determine a gradient associated with the time. Fault detection system 402 may multiply the gradient by a constant to obtain a scaled gradient. Fault detection system 402 may subtract the scaled gradient from the time that the cumulative sum value reaches the threshold to obtain a new time. Fault detection system 402 may determine a gradient for the new time and compare it to a threshold. If fault detection system 402 determines the gradient exceeds the threshold, fault detection system 402 may repeat the process until determining a gradient that is equal to zero or is otherwise less than the threshold.

In some embodiments, fault detection system 402 may perform a smoothing operation on the cumulative sum values to generate smoothed cumulative sum values before performing any of the processes described above and determine a most recent minimum of the cumulative sum values of the smoothed cumulative sum line. Fault detection system 402 may perform the smoothing operation by using a sliding average window that continuously takes the average of multiple cumulative sum values over time. Fault detection system 402 may take the averages of cumulative sum values in small windows over the length of the cumulative sum values to create the smoothed cumulative sum values. Once fault detection system 402 creates the smoothed cumulative sum values, fault detection system 402 may determine the minimum of the smoothed cumulative sum values using any of the techniques described above.

In step 808, fault detection system 402 may determine that a first fault began at the second time, in some embodiments. For example, fault detection system 402 may analyze the values before the first time using any of the methods described above to determine a local minimum that occurred at a second time closest in time to the first time. Fault detection system 402 may determine that the first fault began at the second time.

Figure 9A:
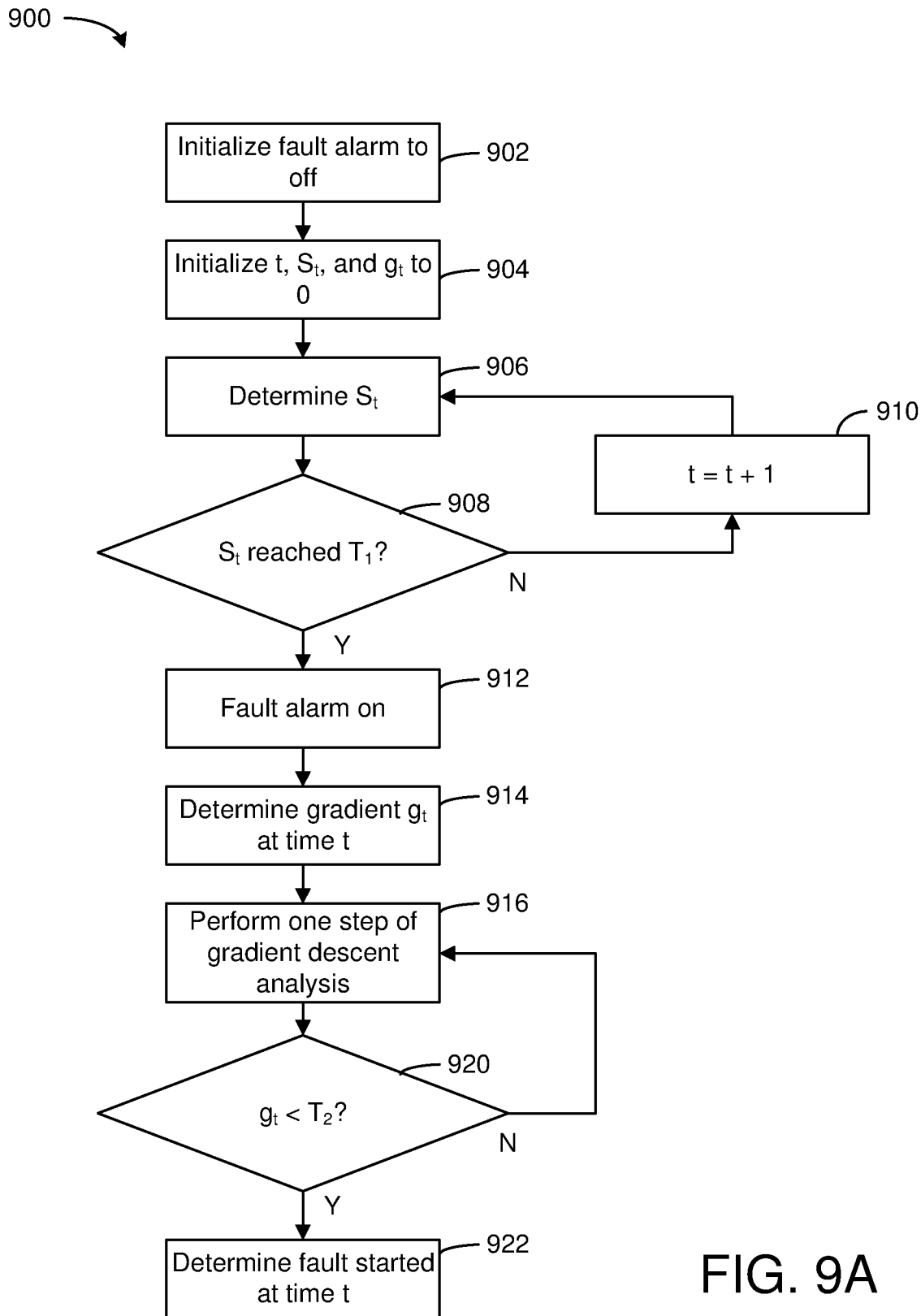
FIG. 9A is a flow diagram of a detailed process for detecting a beginning of a fault, according to an exemplary embodiment.

Referring now to FIG. 9A, a flow diagram of a detailed process 900 for detecting a beginning of a fault is shown, according to an exemplary embodiment. Any system or device described herein can be configured to perform some and/or all of process 900. In some embodiments, fault detection system 402 is configured to perform some and/or all of the steps of process 900. For example, components of fault detection system 402 may be configured to perform process 900. Furthermore, building controller 426 can be configured to perform some and/or all of process 900. Advantageously, by performing process 900, fault detection system 402 may be able to accurately identify the beginning of faults that occurred related to various points of a BAS without falsely identifying plateaus in cumulative sum values as the beginning of the faults. Further, by performing process 900, fault detection system 402 may be able to more accurately identify the beginning of faults for any type of system as described above.

In step 902, fault detection system 402 may initialize a fault alarm to off. In some embodiments, off is represented by a one or a zero. Off may be represented by any character or number. The fault alarm may indicate whether a BAS is operating normally in a fault state at a given time of the CUSUM. In step 904, fault detection system 402 may initialize the variables of t, $S_t$, and $g_t$ to zero. t may be a time for which fault detection system 402 is analyzing an associated value. $S_t$ may be a cumulative sum value at time t. $g_t$ may be a gradient at time t.

In step 906, fault detection system 402 may determine $S_t$ for time t. At t=0, fault detection system 402 may determine that $S_t$ is equal to 0. To determine $S_t$ for times subsequent to t=0, fault detection system 402 may determine error values for the times and aggregate the error value with each or a portion of the times previous to the time associated with the error value. To determine the error value at a particular time t, fault detection system 402 may identify the actual value and corresponding predicted value for time t. Fault detection system 402 may obtain the predicted value from a predictive model that predicts values of various points for times within various time periods. Fault detection system 402 may determine the difference between the actual value and the predicted value and compare the difference to a threshold to obtain the error value. The error value may be a distance between the difference and the threshold. Fault detection system 402 may determine differences that exceed the threshold to be positive errors and differences that are less than the threshold to be negative errors. Fault detection system 402 may determine an error value for time t and aggregate the error value with a previous cumulative sum value to determine a value for $S_t$.

In step 908, fault detection system 402 may determine whether $S_t$ has reached $T_1$. $T_1$ may be a fault threshold that indicates whether a point of BAS 200 is associated with a fault. An administrator may determine $T_1$ to be any value. Fault detection system 402 may compare $S_t$ and $T_1$ to determine whether $S_t$ is greater than or, in some embodiments, equal to $T_1$. If fault detection system 402 determines that $S_t$ has not reached $T_1$, in step 910, fault detection system 402 may increment t, return to step 906 to determine $S_t$ for the incremented t, and determine whether $S_t$ for the incremented time t has reached $T_1$. Fault detection system 402 may repeat steps 906-910 until fault detection system 402 determines a time for which $S_t$ has reached $T_1$. If fault detection system 402 does not determine a time in which $S_t$ has reached $T_1$, fault detection system 402 may generate an alert indicating that no fault could be found. However, if fault detection system 402 determines a time in which $S_t$ has reached $T_1$, in step 912, fault detection system 402 may set fault alarm to on (e.g., generate an indication that a fault occurred within the time period).

For example, fault detection system 402 may analyze data related to the building occupancy of a BAS during the months of January, February, and March. Fault detection system 402 may initialize $S_t$ and t to zero corresponding to January $1^{st}$. Fault detection system 402 may determine the error value for building occupancy for January 1st and set cumulative sum value $S_t$ to the error value. Fault detection system 402 may then determine an error value for January $2^{nd}$ and add the error value for January $2^{nd}$ to the $S_t$ value for January $1^{st}$ to obtain an $S_t$ value for January $2^{nd}$. Fault detection system 402 may compare the $S_t$ to $T_1$ to determine whether $S_t$ has reached $T_1$. Fault detection system 402 may determine $S_t$ has not reached $T_1$ and determine $S_t$ for January $3^{rd}$, repeating the process until fault detection system 402 identifies a day in which $S_t$ has reached $T_1$. Once fault detection system 402 identifies a day in which $S_t$ has reached $T_1$, fault detection system 402 may determine that a fault occurred within the time period including January, February, and March.

In another example, fault detection system 402 may analyze data related to the building occupancy of a BAS during the days of January $1^{st}$ through January $4^{th}$. Fault detection system 402 may initialize $S_t$ and t to zero corresponding to January $1^{st}$ at 12:00 P.M. Fault detection system 402 may determine the error value for building occupancy for January $1^{st}$ at 12:00 P.M. and set cumulative sum value $S_t$ to the error value. Fault detection system 402 may then determine an error value for January $1^{st}$ at 12:01 P.M. and add the error value for January $1^{st}$ at 12:00 P.M. to the $S_t$ value for January $1^{st}$ at 12:01 P.M. to obtain an $S_t$ value for January $1^{st}$ at 12:01 P.M. Fault detection system 402 may compare the $S_t$ value to $T_1$ to determine whether $S_t$ has reached $T_1$. Fault detection system 402 may determine $S_t$ has not reached $T_1$ and determine $S_t$ for January $1^{st}$ at 12:02 P.M., repeating the process until fault detection system 402 identifies a day in which $S_t$ has reached $T_1$. Once fault detection system 402 identifies a day in which $S_t$ has reached $T_1$, fault detection system 402 may determine that a fault occurred within the time period between January $1^{st}$ and January $4^{th}$. Fault detection may determine faults for any time and using any unit of time as a measurement.

In step 914, fault detection system 402 may determine the gradient $g_t$ for the time in which $S_t$ reaches $T_1$. Fault detection system 402 may determine the gradient by determining the change over time of $S_t$ between time t and the time previous to time t. Fault detection system 402 may determine the gradient using any method. In step 916, fault detection system 402 may use the gradient at time t to perform a step of a gradient descent analysis. To do so, fault detection system 402 may determine the next time of a step $\lambda\Delta S|_{t_{k-1}}$ using the following equation:

$$t_k = t_{k-1} - \lambda \Delta S|_{t_{k-1}}$$

In some cases, k is a step number in the analysis. $t_k$ may be the time associated with step k. $t_{k-1}$ may be the time associated with a previous step k−1. S may be a cumulative error value for a time t. $\Delta S|_{t_{k-1}}$ may be the gradient or an estimate of the gradient of the cumulative error value at the time associated with a previous step $t_{k-1}$. $\lambda$ may be a normalizing/scale factor to normalize or scale values for S (e.g., to cause them to be within the range [0,1]). $\lambda$ may also be implemented to tune the magnitude of the gradients. k may be initialized to 1 at the time in which S reaches $T_1$.

In step 918, fault detection system 402 may determine the gradient $g_{t_k}$ at time $t_k$ and determine whether $g_{t_k}$ is less than $T_2$. $g_{t_k}$ may be the gradient at time $t_k$ and $T_2$ may be a second threshold. $T_2$ may be any value as determined by an administrator. In some embodiments, fault detection system 402 may determine whether $g_{t_k}$ is equal to zero. If $g_{t_k}$ exceeds $T_2$, fault detection system 402 may perform another step of the gradient descent analysis in step 916 and repeat steps 916 and 918 until it identifies a time $t_k$ in which $g_{t_k}$ is less than $T_2$. Once fault detection system 402 identifies a time $t_k$ in which $g_{t_k}$ is less than $T_2$, in step 922, fault detection system 402 may determine that the fault started at the identified time $t_k$. Fault detection system 402 may generate an alert indicating the fault began at time $t_k$. In some instances, $t_k$ may not be an integer. In such instances, fault detection system 402 may round $t_k$ to the next integer to determine when the fault began.

Figure 9B:
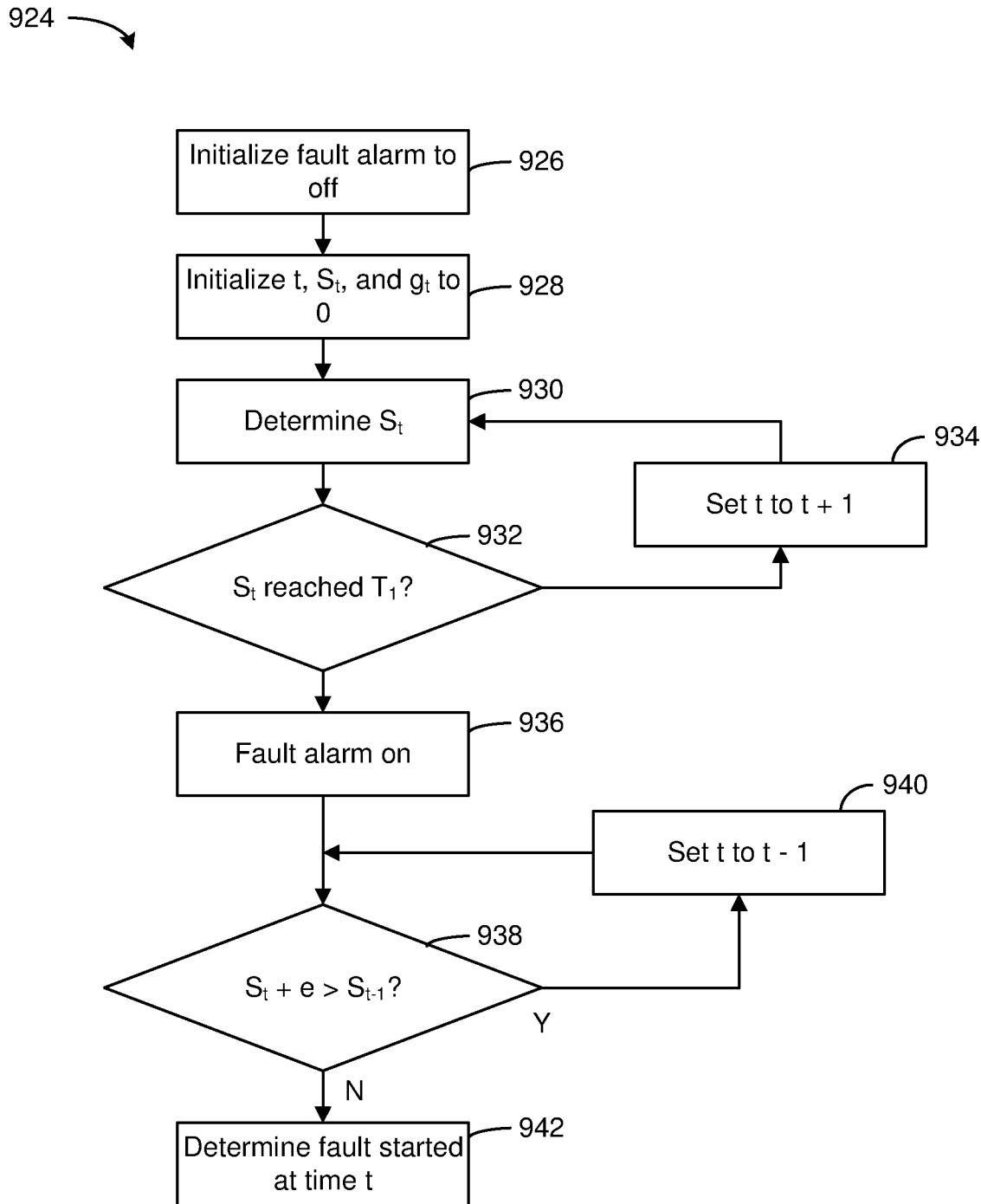
FIG. 9B is another flow diagram of a detailed process for detecting a beginning of a fault, according to an exemplary embodiment.

Referring now to FIG. 9B, another flow diagram of a detailed process 924 for detecting a beginning of a fault is shown, according to an exemplary embodiment. Any system or device described herein can be configured to perform some and/or all of process 924. In some embodiments, fault detection system 402 is configured to perform some and/or all of the steps of process 924. For example, components of fault detection system 402 may be configured to perform process 924. Furthermore, building controller 426 can be configured to perform some and/or all of process 924. Fault detection system 402 may perform steps 926-936 to determine that a fault occurred within a previous time period in a similar manner to how fault detection system 402 performs steps 902-912, shown and described with reference to FIG. 9A. Advantageously, by performing process 924, fault detection system 402 may be able to accurately identify the beginning of faults that occurred related to various points of a BAS without identifying wrong local minimums as being associated with the beginning of faults. Further, by performing process 924, fault detection system 402 may be able to more accurately identify the beginning of faults for any type of system as described above.

In step 938, fault detection system 402 may determine whether $S_t + e$ is greater than $S_{t-1}$. $S_t$ may be a cumulative sum value at time t. t may be initialized to a time in which the $S_t$ reaches a threshold $T_1$. t−1 may be a time previous to time t. For example, in some embodiments, if t is February $2^{nd}$, t−1 would be February $1^{st}$. e may be a constant as determined by an administrator. e may be any value. Fault detection system 402 may compare $S_t + e$ to $S_{t-1}$ to determine whether $S_t + e$ is greater than $S_{t-1}$. If fault detection system 402 determines that $S_t + e$ is greater than $S_{t-1}$, in step 940, fault detection system 402 may set t to t−1 and repeat step 938. Fault detection system 402 may repeat steps 938 and 940 until it identifies a time in which $S_t + e$ is not greater than $S_{t-1}$. Once fault detection system 402 identifies a time tin which $S_t + e$ is not greater than $S_{t-1}$, in step 942, fault detection system 402 may determine that the fault started at the identified time t.

For example, fault detection system 402 may determine that a fault in the energy consumption of a BAS occurred on July $4^{th}$ based on $S_{July\ 4th}$ reaching a threshold $T_1$. Fault detection system 402 may determine $S_{July\ 4th}$ using the methods described herein. Fault detection system 402 may determine $S_{July\ 3rd}$. Fault detection system 402 may determine that $S_{July\ 4th} + e$ is greater than $S_{July\ 3rd}$. Fault detection system 402 may determine $S_{July\ 2nd}$. Fault detection system 402 may determine that $S_{July\ 3rd} + e$ is not greater than $S_{July\ 2nd}$ and consequently determine that a fault in the energy consumption of the BAS began on July $3^{rd}$.

Referring now to FIG. 10, two CUSUM charts 1002 and 1014 illustrating an adaptive CUSUM analysis are shown, according to an exemplary embodiment. CUSUM chart 1002 illustrates a CUSUM 1004 as it increases above a fault threshold 1006 until it reaches a global maximum at time 1008 and gradually decreases until it goes below fault threshold 1006 at a time 1012. While CUSUM 1004 decreases after the maximum at time 1008, CUSUM 1004 has periods where it increases for a time until it reaches a local maximum and then starts decreasing again, as represented by local maximums 1010. Fault detection system 402 may determine that a fault began at the time that CUSUM crossed fault threshold 1006 and analyze local maximums $S'_{k_1}$, $S'_{k_2}$, and/or $S'_{k_3}$ that occurred after the global maximum that occurred at time 1008 to determine when the fault ended.

To analyze local maximums $S'_{k_1}$, $S'_{k_2}$, and/or $S'_{k_3}$, fault detection system 402 may perform a CUSUM analysis on the values within the time period beginning at the time that the global maximum occurred and ending at the time that CUSUM 1004 crossed below fault threshold 1006. By performing the CUSUM analysis, fault detection system 402 may generate CUSUM chart 1014. CUSUM chart 1014 illustrates a CUSUM analysis starting at time 1008 and ending at time 1012. CUSUM chart 1014 includes a CUSUM 1016 that does not decrease below zero, in some embodiments. CUSUM 1016 is shown to include local maximums 1018. The values of local maximums 1018 may be compared against a fault threshold 1020 to determine if any of the values exceed fault threshold 1020. Fault threshold 1020 may be equal to fault threshold 1006, in some embodiments. Local maximums 1018 may correspond to local maximums 1010. As shown, none of local maximums 1018 may exceed fault threshold 1020. Consequently, fault detection system 402 may determine that the fault ended at time 1008.

Figure 11:
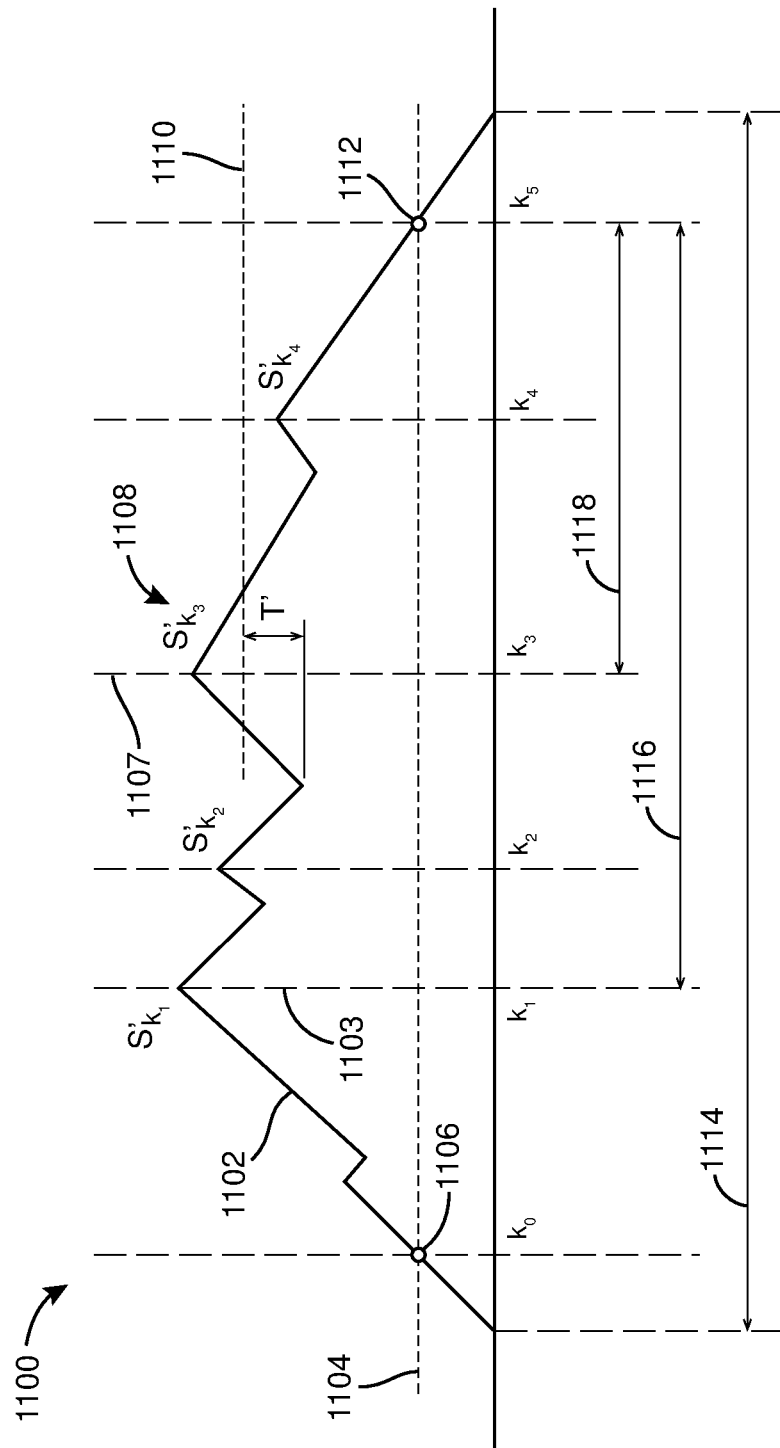
FIG. 11 is a CUSUM chart illustrating an iterative adaptive CUSUM analysis, according to an exemplary embodiment.

Referring now to FIG. 11, a CUSUM chart 1100 illustrating an iterative adaptive CUSUM analysis is shown, according to an exemplary embodiment. Fault detection system 402 may perform the iterative adaptive CUSUM analysis for any type of system as described above. CUSUM chart 1100 is shown to include a CUSUM 1102 and a fault threshold 1104. CUSUM 1102 is shown to cross fault threshold 1104 at a time 1106 and reach a global maximum at a time 1103. CUSUM chart 1100 may illustrate an iterative CUSUM analysis that fault detection system 402 performs to determine that a fault ended at a time 1107. To perform the iterative CUSUM analysis, fault detection system 402 may perform a first CUSUM analysis over a time period 1114. Based on the first CUSUM analysis, fault detection system may determine that a fault occurred at time 1103 and that CUSUM 1102 crossed back below fault threshold 1104 at a time 1112. Fault detection system 402 may perform a second CUSUM analysis over a second time period 1116. Second time period may begin at time 1103 and end at time 1112. Based on the second CUSUM analysis, fault detection system 402 may compare local maximums 1108 to a second fault threshold 1110 and determine if any of the local maximums exceed second fault threshold 1110. As shown, fault detection system 402 may determine that a local maximum at a time 1107 exceeds second fault threshold 1110. Fault detection system 402 may perform a third CUSUM analysis over a time period 1118. Time period 1118 may begin at time 1107 and end at time 1112. Fault detection system 402 may compare the values of the maximums in time period 1118 to second fault threshold 1110, determine none of the values exceed second fault threshold 1110, and determine that the fault ended at time 1107.

Figure 12:
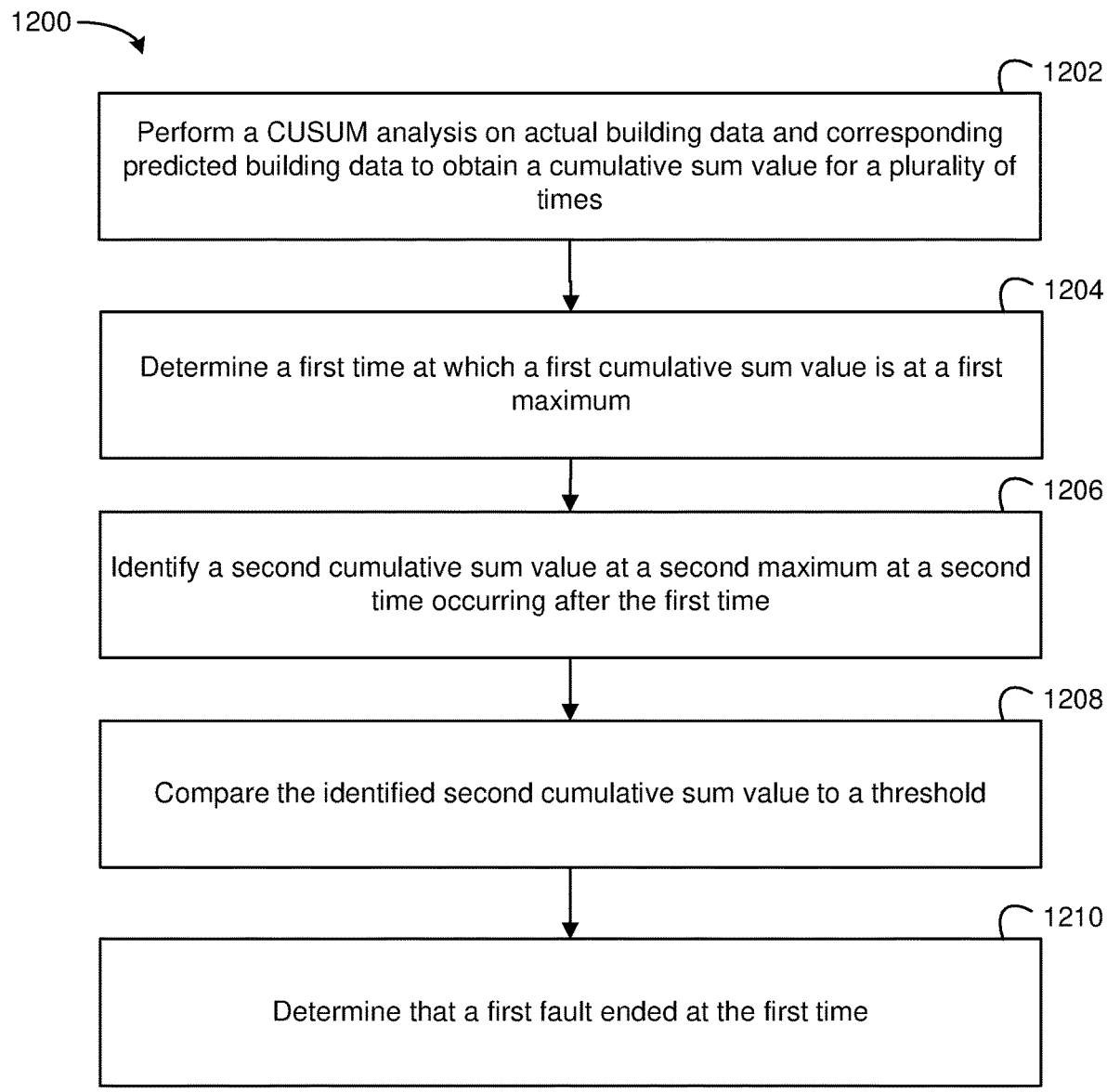
FIG. 12 is a flow diagram of a process for detecting an end of a fault, according to an exemplary embodiment.

Referring now to FIG. 12, a flow diagram of a process 1200 for detecting an end of a fault is shown, according to an exemplary embodiment. Any system or device described herein can be configured to perform some and/or all of process 1200. In some embodiments, fault detection system 402 is configured to perform some and/or all of the steps of process 1200. For example, components of fault detection system 402 may be configured to perform process 1200. Furthermore, building controller 426 can be configured to perform some and/or all of process 1200. Advantageously, by performing process 1200, fault detection system 402 may be able to accurately identify the end of faults for various points of a BAS. Further, by performing process 1200, fault detection system 402 may be able to more accurately identify the end of faults for any type of system as described above.

In step 1202, fault detection system 402 may perform a CUSUM analysis on actual building data and corresponding predicted building data to obtain a cumulative sum value for a number of times within a set time period. A CUSUM analysis may include determining the cumulative sum value for one or more particular times or dates. For example, a time period may be a year and a time or date may be a day within the year. Cumulative sum values may be cumulative error values including the aggregated error of a point of a BAS for time-steps up to and, in some cases, including the time associated with the cumulative sum value. Fault detection system 402 may determine the error values by determining the difference between actual and predicted values for a point at a specific time or date. In some embodiments, the error values may be the distance that the difference is away (above or below) a threshold. The error values may be positive or negative so the cumulative sum values may increase or decrease over time. Fault detection system 402 may perform the CUSUM analysis for times over the entire time period so a portion of or each time-step within the time period may be associated with a cumulative sum value.

In step 1204, fault detection system 402 may determine a first time at which a first cumulative sum value is at a first maximum. The first maximum may be a global maximum or a local maximum. Fault detection system 402 may identify the first maximum by identifying a time in which a cumulative sum value increases above a threshold and continuing to identify cumulative sum values for times until identifying a time in which the cumulative sum value decreases from the cumulative sum value of the previous time. The first maximum may be at the time before the lower cumulative sum value. Fault detection system 402 may identify the time associated with the first maximum as the first time.

In step 1206, fault detection system 402 may identify a second cumulative sum value at a second maximum occurring at a second time occurring after the first time. The second maximum may be a global maximum or a local maximum. Fault detection system 402 may identify the second maximum by performing a second CUSUM analysis on cumulative sum values starting at the first time and end at a third time in which the cumulative sum values decrease below the threshold. In some embodiments, in the second CUSUM analysis, fault detection system 402 does not allow for a cumulative sum value to decrease below zero. For example, if fault detection system 402 determines a relative negative error value for a time-step and the aggregated error value for the times previous to the time-step is zero, fault detection system 402 may determine that the cumulative sum value remains at zero instead of going below zero. Fault detection system 402 may identify the second maximum from the second CUSUM analysis in a similar manner to how fault detection system 402 identified the first maximum from the first CUSUM analysis. The second maximum may correspond to or be the same as a maximum from the first CUSUM analysis that occurred after the first maximum. In some embodiments, fault detection system 402 may determine all of the local maximums occurring after the first maximum and determine the second local maximum to be the local maximum that is associated with the highest cumulative sum value. Advantageously, by using a second CUSUM analysis to identify the second maximum, fault detection system 402 may more easily identify the height of the second maximum (e.g., the height of the second maximum may be equal to the cumulative sum value of the second maximum). The height may be a difference between the cumulative sum value at a minimum occurring before the second maximum and the cumulative sum value at the second maximum and/or the cumulative sum value at the local maximum obtained as a result of the second CUSUM analysis.

In step 1208, fault detection system 402 may compare the second cumulative sum value to a second threshold. The second cumulative sum value may correspond to a height of the second maximum. If the second cumulative sum value exceeds the second threshold, fault detection system 402 may determine that the fault lasted until at least the time associated with the second cumulative sum value. Otherwise, if fault detection system 402 determines that the second cumulative sum value is below the threshold, in step 1210, fault detection system 402 may determine that the fault ended at the first time.

In some embodiments, if fault detection system 402 determines that the second cumulative sum value exceeds the second threshold, fault detection system 402 may perform a third cumulative sum analysis for the times between the second time and the time in which the cumulative sum values decrease below the second threshold. Fault detection system 402 may identify any maximums from the third cumulative sum analysis and determine whether any of them exceed the second threshold. Fault detection system 402 may repeatedly perform this process until it identifies the last maximum that exceeds the second threshold within the time period and determines the fault ended at the time associated with the last maximum.

Advantageously, through performance of process 1200, fault detection system 402 may more accurately determine the ends of faults compared to previous methods in which processors determine that faults end when a cumulative sum value decreases below a threshold. Previous methods may often determine faults to end well after an associated BAS (or other type of system) begins operating under normal conditions. By performing process 1200, fault detection system 402 may more accurately determine when the faults end and consequently provide more accurate information to administrators seeking to determine how well the BAS is performing. In some embodiments, fault detection system 402 may provide the indications to a controller so the controller may identify faulty equipment and, in some cases, potentially redirect signals to other equipment so the BAS may begin operating more efficiently.

Figure 13:
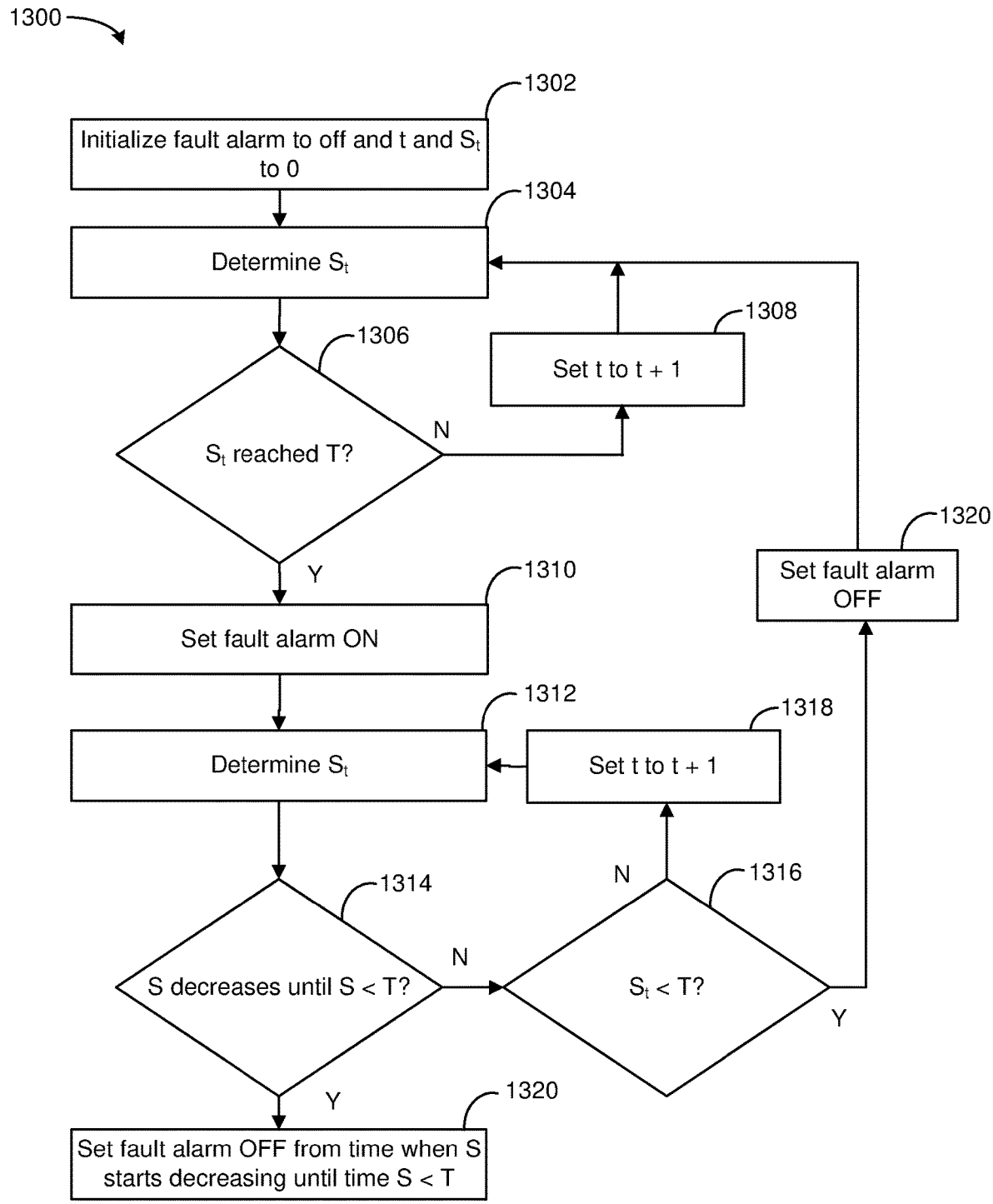
FIG. 13 is a flow diagram of a detailed process for detecting an end of a fault, according to an exemplary embodiment.

Referring now to FIG. 13, a flow diagram of a detailed process 1300 for detecting an end of a fault is shown, according to an exemplary embodiment. Any system or device described herein can be configured to perform some and/or all of process 1300. In some embodiments, fault detection system 402 is configured to perform some and/or all of the steps of process 1300. For example, components of fault detection system 402 may be configured to perform process 1300. Furthermore, building controller 426 can be configured to perform some and/or all of process 1300. Advantageously, by performing process 1300, fault detection system 402 may be able to accurately identify the end of faults that occurred for various points of a BAS. Further, by performing process 1300, fault detection system 402 may be able to more accurately identify the beginning of faults for any type of system as described above.

In step 1302, fault detection system 402 may initialize a fault alarm to off and one or each oft and $S_t$ to 0. In some embodiments, off is represented by a one or a zero. Off may be represented by any character or number. t may be a time for which fault detection system 402 is analyzing an associated value. $S_t$ may be a cumulative sum value at time t. In step 1304, fault detection system 402 may determine $S_t$. In step 1304, fault detection system 402 may determine $S_t$ for time t. At t=0, fault detection system 402 may determine that $S_t$ is equal to 0. To determine $S_t$ for times subsequent to t=0, fault detection system 402 may determine error values for the times and aggregate the error value with each or a portion of the times previous to the time associated with the error value. To determine the error value at a particular time t, fault detection system 402 may identify the actual value and the corresponding predicted value for time t. Fault detection system 402 may obtain the predicted value from a predictive model that predicts values of various points for various time periods. Fault detection system 402 may determine the difference between the actual value and the predicted value and compare the difference to a threshold to obtain the error value. The error value may be a distance between the difference and the threshold. Fault detection system 402 may determine differences that exceed the threshold to be positive errors and differences that are less than the threshold to be relative negative errors. Fault detection system 402 may determine an error value for time t and aggregate the error value with a previous cumulative sum value to determine a value for $S_t$.

In step 1306, fault detection system 402 may determine whether $S_t$ reached $T_1$. In step 1308, fault detection system 402 may set t to t+1 (increment t). In step 1310, fault detection system may set the fault alarm to on. Fault detection system 402 may perform each of steps 1302-1310 similar to how fault detection system 402 performs corresponding steps 902-912, shown and described with reference to FIG. 9. In some embodiments, fault detection In step 1312, fault detection system 402 may determine $S_t$. Fault detection system 402 may determine $S_t$ similar to how fault detection system 402 determined $S_t$ at step 1304. In step 1314, fault detection system 402 may determine whether there is a time period after $S_t$ in which S consistently decreases for a predetermined time or a predetermined number of time-steps before going below T. For example, fault detection system 402 may determine S for multiple time-steps after $S_t$ and before S crosses below T. Fault detection system 402 may determine the gradient of S for each of the time-steps and/or the difference between each sequential time-step. If the gradient or the difference between the time-steps remains constant within a predetermined range for a predetermined number of time-steps until S decreases below T, in step 1320, fault detection system 402 may set the fault alarm to off from the time that $S_t$ begins decreasing at a constant rate towards T. Otherwise, at step 1316, fault detection system 402 may determine whether $S_t$ is less than T.

Fault detection system 402 may determine whether $S_t$ is less than T by comparing $S_t$ to T. If fault detection system 402 determines that $S_t$ is greater than T, in step 1318, fault detection system 402 may set t to t+1 and repeat steps 1312, 1314, 1316, and/or 1318 until fault detection system 402 either identifies a time in step 1314 in which S begins decreasing until S is below T or identifies a value for $S_t$ in step 1316 in which $S_t$ is below T. If fault detection system 402 identifies a value for $S_t$ in which $S_t$ is less than T, in step 1320, fault detection system 402 may set fault the alarm to off and fault detection system 402 may perform step 1304 to identify any more faults that occurred in the same point after the previous fault ended.

Figure 14:
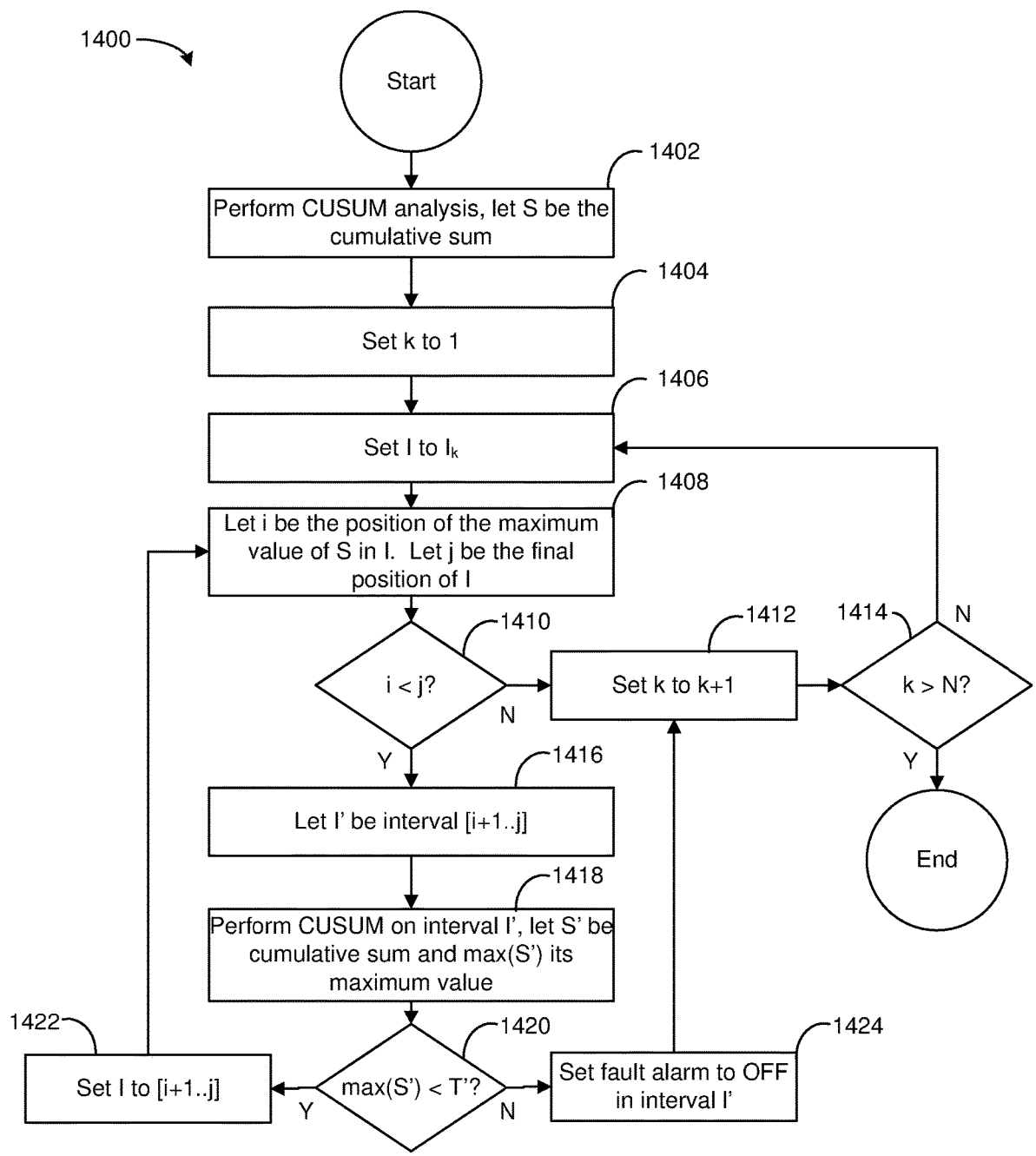
FIG. 14 is a flow diagram of an iterative process for detecting an end of a fault, according to an exemplary embodiment.

Referring now to FIG. 14, a flow diagram of an iterative process 1400 for detecting an end of a fault is shown, according to an exemplary embodiment. Any system or device described herein can be configured to perform some and/or all of process 1400. In some embodiments, fault detection system 402 is configured to perform some and/or all of the steps of process 1400. For example, components of fault detection system 402 may be configured to perform process 1400. Furthermore, building controller 426 can be configured to perform some and/or all of process 1400. Advantageously, by performing process 1400, fault detection system 402 may be able to accurately identify the ends of faults for various points of a BAS by iteratively accounting for maximums occurring after a first maximum. Further, by performing process 1400, fault detection system 402 may be able to more accurately identify the end of faults for any type of system as described above.

In step 1402, fault detection system 402 may perform a CUSUM analysis over a time period to obtain a cumulative value S for various times or time-steps over the time period. Fault detection system 402 may perform the CUSUM analysis for times of the entire time period or a portion of it. Fault detection system 402 may perform the CUSUM analysis similar to how fault detection system 402 performed the CUSUM analysis in step 1202, shown and described with reference to FIG. 12. In step 1404, fault detection system 402 may set a variable k to 1. In step 1406, fault detection system 402 may set a variable I to $I_k$. I may represent a time interval in which a fault is occurring. In step 1408, fault detection system may let a variable i be a position of a maximum value of S in the interval of I. Fault detection system 402 may also let a variable j be a final position of the interval of I.

In step 1410, fault detection system 402 may determine whether i is less j. Fault detection system 402 may do so by comparing i to j. If fault detection system 402 determines i is greater than j, in step 1412, fault detection system 402 may set k to k+1. In step 1414, fault detection system 402 may determine if k is greater than a value N. If fault detection system 402 determines that k is greater than the value N, process 1400 may end. If fault detection system 402 determines k is not greater than the value N, fault detection system 402 may return to step 1406. In step 1410, if fault detection system 402 determines i is less than j, in step 1416, fault detection system 402 may let I' be the interval [i+1 . . . j]. In step 1418, fault detection system 402 may perform a second CUSUM analysis on the interval I'. Fault detection system 402 may let S' be the cumulative sum value for a time of the interval I' and max(S') be the maximum value of S' in the interval I'. In step 1420, fault detection system 402 may determine whether max(S') is less than T'. T' may be a threshold. If fault detection system 402 determines that max(S') is less than T', in step 1422, fault detection system 402 may set the interval for I to [i+1 . . . j] and return to step 1408. Fault detection system 402 may set I to [i+1 . . . j]. Otherwise, in step 1424, fault detection system 402 may set the fault alarm to off during the interval I' and return to step 1412.

In some embodiments, fault detection system 402 may use the systems and methods described herein to determine both the beginning and the end of a fault. For example, fault detection system 402 may perform a CUSUM analysis on values between August $1^{st}$ at 12:00 P.M. and August $4^{th}$ at 12:00 P.M. Fault detection system 402 may generate cumulative sum values for each second or a portion of the seconds within the time period. Fault detection system 402 may generate cumulative sum values for any unit of measurement (e.g., day, hour, minute, second, portion of a second, etc.) between August $1^{st}$ at 12:00 P.M. and August $4^{th}$ at 12:00 P.M. Fault detection system 402 may determine that a cumulative sum value reached a threshold on August $2^{nd}$ at 1:53 P.M. Fault detection system 402 may identify a local minimum in the cumulative sum values that occurred on August $2^{nd}$ at 1:23 P.M. and determine that the fault began at 1:23 P.M. Fault detection system 402 may identify a maximum that occurred at 5:52 P.M. on August $2^{nd}$. Consequently, fault detection system 402 may analyze cumulative sum values occurring after 5:52 P.M. to determine if there is a subsequent maximum with a cumulative sum value that exceeds a threshold. Fault detection system 402 may determine that there is not a subsequent maximum with a cumulative value that exceeds the threshold and determine that the fault ended at 5:52 P.M.

Advantageously, by performing the processes described herein, fault detection system 402 may more accurately detect the beginning and end of faults that occur in a system (e.g., a point of a BAS) over a previous time period. Previous systems may determine that faults begin when a cumulative sum value exceeds a threshold and end when another cumulative sum value decreases below the threshold. These systems may not be able to detect faults that begin before a cumulative sum value increases above the threshold and/or end before a cumulative sum value decreases below the threshold. By implementing the methods described herein, fault detection system 402 may determine such boundaries. This allows for administrators (e.g., building managers) to obtain a better view of how their associated system is operating and/or allows for a controller of the BAS to determine control signals to provide to building equipment of the BAS.

Further, another advantage to using the systems and methods described herein is that they can be implemented to detect faults in any type of system. While building automation systems can use methods to automatically identify the boundaries of faults and operate accordingly (e.g., switch the network path of various control signals) other systems may similarly identify faults to alert administrators that there is a problem. For example, the methods may be used to automatically identify faults in a data center that are causing stored data to be corrupted and/or erased from the data center. In another example, the methods may be used to determine traffic lights are not working properly. The methods may be used to identify faults in any type of system.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system for detecting faults in an operation of building equipment, the building system comprising one or more non-transitory memory devices configured to store instructions thereon that, when executed by one or more processors, cause the one or more processors to:

receive actual building data from a plurality of sensors;

generate a model indicating corresponding predicted building data;

perform a cumulative sum (CUSUM) analysis on the actual building data and the corresponding predicted building data to obtain cumulative sum values for a first plurality of times within a first time period, wherein the cumulative sum values are cumulative error values determined based on the actual building data and the corresponding predicted building data;

determine a first time at which a first cumulative sum value reaches a threshold;

analyze cumulative sum values associated with a second plurality of times occurring before the first time to identify a second time of the second plurality of times at which a second cumulative sum value is at a local minimum, wherein the local minimum is lower than the next and the previous cumulative sum value, wherein analyzing the cumulative sum values comprises stepping backward in time from the first time and, with each step backward in time, comparing a corresponding cumulative sum value with a previously analyzed cumulative sum value until reaching a time at which the corresponding cumulative sum value either increases or does not change relative to the previously analyzed cumulative sum value;

determine that a first fault began at the second time; and at least one of:
(i) execute a control or maintenance activity based on the first fault, the control or maintenance activity comprising at least one of repairing the first fault or working-around the first fault, shutting-down one or more devices or systems in response to the first fault, or directing control activities around the one or more devices or systems in response to the first fault, or
(ii) generate an alert in a user interface indicating the first fault began at the second time.

2. The building system of claim 1, wherein the one or more processors analyze the cumulative sum values associated with the second plurality of times by:
  determining a first gradient at the first time;
  obtaining a first gradient step based on the first gradient;
  determining the second time based on the first gradient step;
  determining a second gradient at the second time; and
  determining whether the second gradient is beneath a second threshold;
  wherein the one or more processors determine that the first fault began at the second time based on a determination that the second gradient is beneath the second threshold.

3. The building system of claim 1, wherein the one or more processors analyze the cumulative sum values associated with the second plurality of times by:
  determining a first gradient at the first time;
  obtaining a first gradient step based on the first gradient;
  determining a third time based on the first gradient step;
  determining a second gradient at the third time;
  determining whether the second gradient is below or equal to a second threshold; and
  responsive to determining that the second gradient is not below the second threshold, iteratively repeating the determining a first gradient at the first time, obtaining a first gradient step based on the first gradient, determining a third time based on the first gradient step, determining a second gradient at the third time, and determining whether the second gradient is below or equal to a second threshold for different times until determining that a gradient of a time is beneath the second threshold, wherein the one or more processors determine that the first fault began at the second time based on a determination that a gradient of a time is beneath the second threshold.

4. The building system of claim 3, wherein the gradient steps decrease in size as more gradient steps are obtained.

5. The building system of claim 1, wherein the CUSUM analysis is a first CUSUM analysis associated with positive error values and the threshold is a first threshold, and wherein the instructions cause the one or more processors to:
  perform a second CUSUM analysis associated with negative error values in the actual building data and the corresponding predicted building data to obtain a third cumulative sum value at each of the first plurality of times within the first time period;
  determine a third time at which one of the obtained third cumulative sum values exceeds a second threshold;
  analyze third cumulative sum values associated with a second plurality of times occurring before the third time to identify a fourth cumulative sum value at a second local minimum at a fourth time occurring before the third time; and
  determine that a second fault began at the fourth time.

6. The building system of claim 5, wherein the instructions cause the one or more processors to:
  determine a second time period in which the first fault occurred and a third time period in which the second fault occurred;
  aggregate the second time period and the third time period to obtain an aggregated time period; and
  generate a user interface displaying the aggregated time period.

7. The building system of claim 1, wherein the first fault is related to an energy consumption, a building occupancy, a temperature, a pressure, or a humidity.

8. The building system of claim 1, wherein the one or more processors analyze the cumulative sum values associated with the second plurality of times by:
  performing a smoothing operation on the cumulative sum values to obtain a smoothed curve; and
  identifying a minimum of the smoothed curve;
  wherein the instructions cause the one or more processors to determine that the first fault began at the second time by:
    determining that the minimum of the smoothed curve is at the second time.

9. The building system of claim 1, wherein the instructions cause the one or more processors to:
  operate one or more pieces of building equipment based on the first fault; or
  generate one or more user interfaces including interface elements based on the first fault.

10. The building system of claim 1, wherein the instructions cause the one or more processors to determine that the first fault began at the second time by:
  identifying the second time;
  identifying a third time and a fourth time occurring after the second time;
  determining a first gradient corresponding to the third time and a second gradient corresponding to the fourth time;
  determining if each of the first gradient and the second gradient exceed a second threshold;
  and based on determining that each of the first gradient and the second gradient exceed the second threshold, determining that the first fault began at the second time.

11. The building system of claim 1, wherein the instructions cause the one or more processors to perform the CUSUM analysis on the actual building data and the corresponding predicted building data to obtain the cumulative sum values for the first plurality of times by:
  comparing the actual building data and the corresponding predicted building data to obtain an error value for at least a portion of the first plurality of times; and
  for each of the portion of the first plurality of times:
    obtain a previous cumulative sum value associated with a previous time;
    identify the error value associated with the time of the portion of the first plurality of times; and
    aggregate the error value with the previous cumulative sum value to obtain the cumulative sum value for the time.

12. A method for detecting faults in an operation of building equipment, the method comprising:
  receiving, by a processing circuit, actual building data from a plurality of sensors;
  generating, by the processing circuit, a model indicating corresponding predicted building data;
  performing, by the processing circuit, a cumulative sum (CUSUM) analysis on the actual building data and the corresponding predicted building data to obtain cumulative sum values for a first plurality of times within a first time period, wherein the cumulative sum values are cumulative error values determined based on the actual building data and the corresponding predicted building data;
  determining, by the processing circuit, a first time at which a first cumulative sum value reaches a threshold;
  analyzing, by the processing circuit, cumulative sum values associated with a second plurality of times occurring before the first time to identify a second time of the second plurality of times at which a second cumulative sum value is at a local minimum, wherein the local minimum is lower than the next and the previous cumulative sum value, wherein analyzing the cumulative sum values comprises stepping backward in time from the first time and, with each step backward in time, comparing a corresponding cumulative sum value with a previously analyzed cumulative sum value until reaching a time at which the corresponding cumulative sum value either increases or does not change relative to the previously analyzed cumulative sum value;

determining, by the processing circuit, that a first fault began at the second time; and at least one of:
  (i) executing a control or maintenance activity based on the first fault, the control or maintenance activity comprising at least one of repairing the first fault or working-around the first fault, shutting-down one or more devices or systems in response to the first fault, or directing control activities around the one or more devices or systems in response to the first fault, or
  (ii) generating an alert in a user interface indicating the first fault began at the second time.

13. The method of claim 12, wherein analyzing the cumulative sum values associated with the second plurality of times comprises:
determining a first gradient at the first time;
obtaining a first gradient step based on the first gradient;
determining the second time based on the first gradient step;
determining a second gradient at the second time; and
determining whether the second gradient is beneath a second threshold;
wherein determining that the first fault began at the second time is performed based on a determination that the second gradient is beneath the second threshold.

14. The method of claim 12, wherein analyzing the cumulative sum values associated with the second plurality of times comprises:
determining a first gradient at the first time;
obtaining a first gradient step based on the first gradient;
determining a third time based on the first gradient step;
determining a second gradient at the third time;
determining whether the second gradient is below or equal to a second threshold; and
responsive to determining that the second gradient is not beneath the second threshold, iteratively repeating the determining a first gradient at the first time, obtaining a first gradient step based on the first gradient, determining a third time based on the first gradient step, determining a second gradient at the third time, and determining whether the second gradient is below or equal to a second threshold for different times until determining that a gradient of a time is beneath the second threshold;
wherein determining that the first fault began at the second time is performed based on a determination that a gradient of a time is beneath the second threshold.

15. The method of claim 14, wherein the gradient steps decrease in size as more gradient steps are obtained.

16. The method of claim 12, wherein the CUSUM analysis is a first CUSUM analysis associated with positive error values and the threshold is a first threshold, the method further comprising:
performing, by the processing circuit, a second CUSUM analysis associated with negative error values in the actual building data and the corresponding predicted building data to obtain a third cumulative sum value at each of the first plurality of times within the first time period;
determining, by the processing circuit, a third time at which one of the obtained third cumulative sum values exceeds a second threshold;
analyzing, by the processing circuit, third cumulative sum values associated with a second plurality of times occurring before the third time to identify a fourth cumulative sum value at a second local minimum at a fourth time occurring before the third time; and
determining, by the processing circuit, that a second fault began at the fourth time.

17. The method of claim 16, further comprising:
determining, by the processing circuit, a second time period in which the first fault occurred and a third time period in which the second fault occurred;
aggregating, by the processing circuit, the second time period and the third time period to obtain an aggregated time period; and
generating, by the processing circuit, a user interface displaying the aggregated time period.

18. A non-transitory computer-readable medium having instructions stored thereon that, upon execution by a processor, cause the processor to perform operations to detect faults in operation of a computing system, the operations comprising:
receiving actual building data from a plurality of sensors;
generating a model indicating corresponding predicted building data;
performing a cumulative sum (CUSUM) analysis on the actual data and the corresponding predicted data to obtain cumulative sum values for a first plurality of times within a first time period, wherein the cumulative sum values are cumulative error values determined based on the actual data and the corresponding predicted data;
determining a first time at which a first cumulative sum value reaches a threshold;
determining one or more gradient steps associated with times before the first time;
based on the one or more gradient steps, identify a second time at which a gradient is below a gradient threshold, wherein identifying the second time comprises stepping backward in time from the first time and, with each step backward in time, comparing a corresponding gradient step with the gradient threshold until determining that the corresponding gradient step is lower than the gradient threshold;
determining that a first fault began at the second time; and
at least one of:
  (i) executing a control or maintenance activity based on the first fault, the control or maintenance activity comprising at least one of repairing the first fault or working-around the first fault, shutting-down one or more devices or systems in response to the first fault, or directing control activities around the one or more devices or systems in response to the first fault, or
  (ii) generating an alert in a user interface indicating the first fault began at the second time.

19. The non-transitory computer-readable medium of claim 18, wherein the CUSUM analysis is a first CUSUM analysis associated with positive error values and the threshold is a first threshold, and wherein the instructions cause the processor to:
perform a second CUSUM analysis associated with negative error values in the actual data and the corresponding predicted data to obtain a third cumulative sum value at each of the first plurality of times within the first time period;

determine a third time at which one of the obtained third cumulative sum values exceeds a second threshold;

analyze third cumulative sum values associated with a second plurality of times occurring before the third time to identify a fourth cumulative sum value at a second local minimum at a fourth time occurring before the third time; and determine that a second fault began at the fourth time.

20. The non-transitory computer-readable medium of claim 19, wherein the instructions cause the processor to:

determine a second time period in which the first fault occurred and a third time period in which the second fault occurred;

aggregate the second time period and the third time period to obtain an aggregated time period; and generate a user interface displaying the aggregated time period.

* * * * *